(12) United States Patent
Olsson et al.

(10) Patent No.: US 11,867,865 B1
(45) Date of Patent: *Jan. 9, 2024

(54) OMNI-INDUCER

(71) Applicant: SeeScan, Inc., San Diego, CA (US)

(72) Inventors: Mark S. Olsson, La Jolla, CA (US);
Ray Merewether, La Jolla, CA (US);
Jan Soukup, San Diego, CA (US);
Michael J. Martin, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,473

(22) Filed: Sep. 28, 2022

Related U.S. Application Data

(63) Continuation of application No. 16/049,699, filed on Jul. 30, 2018, now Pat. No. 11,474,275, which is a
(Continued)

(51) Int. Cl.
  *G01V 3/10* (2006.01)
  *G01V 3/12* (2006.01)
  (Continued)

(52) U.S. Cl.
  CPC .................. *G01V 3/12* (2013.01); *G01V 3/08* (2013.01); *G01V 3/108* (2013.01); *H01Q 1/1228* (2013.01);
  (Continued)

(58) Field of Classification Search
  CPC ......... G01V 3/08–12; G01V 3/15; H01Q 7/00
  See application file for complete search history.

(56) References Cited

U.S. PATENT DOCUMENTS 5,055,793 A * 10/1991 Mulcahey ................ G01V 3/06
  324/329
7,336,078 B1 * 2/2008 Merewether ............. G01V 3/15
  324/67
(Continued)

FOREIGN PATENT DOCUMENTS

WO    2006081615    8/2006

OTHER PUBLICATIONS

International Searching Authority, "Written Opinion of the International Searching Authority" for PCT Patent Application No. PCT/US13/041006, dated Nov. 14, 2014, European Patent Office, Munich.

*Primary Examiner* — Hasan Islam
(74) *Attorney, Agent, or Firm* — Steven C. Tietsworth, Esq.; Michael J. Pennington, Esq.

(57) ABSTRACT

Omnidirectional electromagnetic signal inducer (omni-inducer) devices are disclosed. The omni-inducer device may include a housing, which may include a conductive base for coupling signals to ground, and an omnidirectional antenna node including a plurality of antenna coil assemblies, where the node may be disposed on or within the housing. The omni-inducer device may further include one or more transmitter modules for generating ones of a plurality of output signals, which may be generated at ones of a plurality of different frequencies, and one or more control circuits configured to control the transmitters and/or other circuits to selectively switch the ones of the plurality of output signals between ones of the plurality of antenna coil assemblies.

19 Claims, 25 Drawing Sheets

Related U.S. Application Data continuation of application No. 13/894,038, filed on May 14, 2013, now Pat. No. 10,042,072.

(60) Provisional application No. 61/781,889, filed on Mar. 14, 2013, provisional application No. 61/646,892, filed on May 14, 2012.

(51) Int. Cl.
*G01V 3/08* (2006.01)
*H01Q 1/12* (2006.01)
*H01Q 21/20* (2006.01)
*H01Q 21/29* (2006.01)
*H01Q 23/00* (2006.01)

(52) U.S. Cl.
CPC ........... *H01Q 21/205* (2013.01); *H01Q 21/29* (2013.01); *H01Q 23/00* (2013.01)

(56) References Cited

U.S. PATENT DOCUMENTS

| | | | |
|---|---|---|---|
| 7,443,154 B1 | 10/2008 | Merewether et al. | |
| 7,809,421 B1 | 10/2010 | Govari | |
| 10,042,072 B2 * | 8/2018 | Olsson | G01V 3/108 |
| 2009/0009410 A1 | 1/2009 | Dolgin et al. | |

* cited by examiner

900

| Time | 0-200ms | 200-300ms | 300-500ms | 500-600ms | 600-800ms | 800-1000ms |
|---|---|---|---|---|---|---|
| Antenna Coil 1 | 30kHz | ----- | 480kHz | ----- | 120kHz | ----- |
| Antenna Coil 2 | 120kHz | ----- | 30kHz | ----- | 480kHz | ----- |
| Antenna Coil 3 | 480kHz | ----- | 120kHz | ----- | 30kHz | ----- |

| Time | 0-200ms | 200-300ms | 300-500ms | 500-600ms | 600-800ms | 800-1000ms |
|---|---|---|---|---|---|---|
| Antenna Coil 1 | 7.5kHz | ----- | 120kHz | ----- | 30kHz | ----- |
| Antenna Coil 2 | 30kHz | ----- | 7.5kHz | ----- | 120kHz | ----- |
| Antenna Coil 3 | 120kHz | ----- | 30kHz | ----- | 7.5kHz | ----- |

| Time | 0-200ms | 200-400ms | 400-600ms |
|---|---|---|---|
| Antenna Coil 1 | 30kHz | 480kHz | 120kHz |
| Antenna Coil 2 | 120kHz | 30kHz | 480kHz |
| Antenna Coil 3 | 480kHz | 120kHz | 30kHz |

| Time | 0-200ms | 200-400ms | 400-600ms |
|---|---|---|---|
| Antenna Coil 1 | 7.5kHz | 120kHz | 30kHz |
| Antenna Coil 2 | 30kHz | 7.5kHz | 120kHz |
| Antenna Coil 3 | 120kHz | 30kHz | 7.5kHz |

*FIG. 13B*

One Example Multi-Coil Transmission Sequence

One Example Multi-Coil Transmission Sequence

One Example Multi-Coil Transmission Sequence

One Example Multi-Coil Transmission Sequence

One Example Multi-Coil Transmission Sequence

One Example Multi-Coil Transmission Sequence ions.
OMNI-INDUCER

CROSS-REFERENCE TO RELATED APPLICATIONS

This application is a continuation of and claims priority to co-pending U.S. patent application Ser. No. 13/894,038, entitled OMNI-INDUCER TRANSMITTING DEVICES AND METHODS, filed May 14, 2013, which claims priority under 35 U.S.C. § 119(e) to U.S. Provisional Patent Application Ser. No. 61/646,892, entitled OMNI-INDUCER TRANSMITTING DEVICES AND METHODS, filed May 14, 2012, and to U.S. Provisional Patent Application Ser. No. 61/781,889, entitled OMNI-INDUCER TRANSMITTING DEVICES AND METHODS, filed Mar. 14, 2013. The content of each of these applications is incorporated by reference herein in its entirety for all purposes.

FIELD

This disclosure relates generally to devices for inducing current flow in buried or hidden utilities, such as pipes, wires, cables, and the like. More specifically, but not exclusively, this disclosure relates to omnidirectional transmitter devices used for inducing signals at one or more frequencies using multiple antenna coils.

BACKGROUND

This disclosure relates generally to transmitter devices. More specifically, but not exclusively, this disclosure relates to transmitter devices used for inducing signals in buried or hidden objects.

In scenarios where a conductor obscured from sight must be located, such as a buried utility line, a transmitter device may often be used to induce signal onto the conductor. Some transmitters require a physical connection to be made with the target conductor. Others may operate by inducing current along a single axis and may be subject to user error by placing the orienting transmitter incorrectly. Most transmitters require a physical connection and induce current onto the conductor, generally requiring the user to manually select a particular frequency. As certain frequencies perform better than others on each locate, user error may also result in the selection of a frequency that is less than ideal.

Accordingly, there is a need in the art to address the above-described as well as other problems.

SUMMARY

The present disclosure relates generally to transmitter devices for inducing signals on conductors, which are typically buried or hidden pipes, wires, cables, and the like. For example, transmitters and coupled omnidirectional antennas may be used to induce signals at one or more frequencies on conductors obscured from plain sight. Signals radiated from the conductors may then be used in conjunction with a buried object locator to determine location, depth, geographic position, mapping information, or other data or information.

In one aspect, the disclosure relates to an omnidirection electromagnetic signal inducer (omni-inducer) device used to induce signal on a conductive object, for instance a conductive pipe underground or within a building's wall. The omni-inducer device may include, for example, a transmitter element and an omnidirectional antenna element. The transmitter element may be powered, for instance, by battery and be enabled to induce signal in one or more frequencies. The omnidirectional antenna element may include a number of coils arranged to transmit signal in all directions. In some embodiments, the transmitter element and omnidirectional antenna element may be connected by a mast.

In another aspect, the disclosure relates to a switching scheme of one or more frequencies between the coils of an omnidirectional antenna element such that each coil may cycle through each of the frequencies over a given period of time. In an exemplary embodiment, three frequencies may be used, and the frequencies may be, for instance, 30, 120, and 480 kHz.

In another aspect, the disclosure relates to a housing or transmitter module that may include a conductive undercarriage or series of foot sections. The conductive undercarriage or foot section(s) may be configured such that when the omni-inducer device is in use, the device may make conductive and/or capacitive coupling to the Earth's surface providing grounding to the device.

In another aspect, the disclosure relates to an omni-inducer device including a timing/positioning system such as GPS or other systems. In such embodiments, the omni-inducer device may function as a beacon to enabled locating devices, providing signaling based on timing information and synchronization with a buried object locator or other device.

In another aspect, the disclosure relates to an omni-inducer device configured to communicate with buried object locating devices ("locators") and/or other pipe mapping systems or devices. Omni-inducer devices may also include the ability to store and process information communicated by the locating device and/or mapping system.

In another aspect, the disclosure relates to a system including an omni-inducer device and an enabled locator device. Such a locator device may, for instance, be enabled to communicate with an omni-inducer device with such information such as, but not limited to, timing information. Such timing information may further be used to synchronize timing of the locator device with that of the omni-inducer device. The communication may be via wired or wireless connections, such as ISM band radio links, Ethernet, Bluetooth devices, USB devices, Wi-Fi connections, or other wired or wireless connections.

In another aspect, the disclosure relates to an omnidirectional electromagnetic signal inducer (omni-inducer) device. The device may include, for example, a housing and an omnidirectional antenna node including a plurality of antenna coil assemblies. The node may be disposed on or within the housing. The device may further include one or more transmitter modules for generating ones of a plurality of output signals, which may be generated at ones of a plurality of different frequencies. The device may further include one or more control circuits. The control circuits may be configured to control the transmitters and/or other circuits to selectively switch the ones of the plurality of output signals between ones of the plurality of antenna coil assemblies. The output signals may be selectively switched within predefined time slots in the ones of a plurality of antenna coils. The housing may include a conductive base to electrically couple an output signal to the ground or other surface. Alternately, or in addition, the device may include one or more leads to electrically couple an output signal to the ground or other surface.

In another aspect, the disclosure relates to an omni-inducer device. The device may include, for example, housing means, omnidirectional antenna means including a plurality of antenna coil assemblies, transmitter means for generating ones of a plurality of output signals at a plurality of different frequencies, and control circuit means for selectively switching the ones of a plurality of output signals between ones of the plurality of antenna coil assemblies.

In another aspect, the disclosure relates to a method for providing an omnidirectional signal for applications such as tracing buried objects. The method may include, for example, generating, in a transmitter module, a first output signal at a predefined frequency, selectively applying the first output signal, in a first time slot, to a first antenna coil assembly of an omnidirectional antenna node including a plurality of antenna coil assemblies, generating, in the transmitter module, a second output signal at the predefined frequency, and selectively applying the second output signal, in a second time slot subsequent to the first time slot, to a second antenna coil assembly of the omnidirectional antenna node.

In another aspect, the disclosure relates to a processor-readable medium. The medium may include instructions for causing a computer to initiate or control one or more of the following processing steps: generating, in a transmitter module, a first output signal at a predefined frequency, selectively applying the first output signal, in a first time slot, to a first antenna coil assembly of an omnidirectional antenna node including a plurality of antenna coil assemblies, generating, in the transmitter module, a second output signal at the predefined frequency, and selectively applying the second output signal, in a second time slot subsequent to the first time slot, to a second antenna coil assembly of the omnidirectional antenna node.

In another aspect, the disclosure relates to one or more computer readable media including non-transitory instructions for causing a computer to perform the above-described methods and/or system or device functions, in whole or in part.

In another aspect, the disclosure relates to apparatus and systems for implementing the above-described methods and/or system or device functions, in whole or in part.

In another aspect, the disclosure relates to means for implementing the above-described methods and/or system or device functions, in whole or in part.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 9A is a table illustrating details of an embodiment of a multi-frequency switching scheme;

FIG. 9B is a table illustrating details of an alternative embodiment of a multi-frequency switching scheme;

FIG. 13A is a table illustrating an alternate embodiment multi-frequency switching scheme;

FIG. 13B is a table illustrating an alternate embodiment multi-frequency switching scheme;

DETAILED DESCRIPTION OF EMBODIMENTS

Overview

Figure 1:
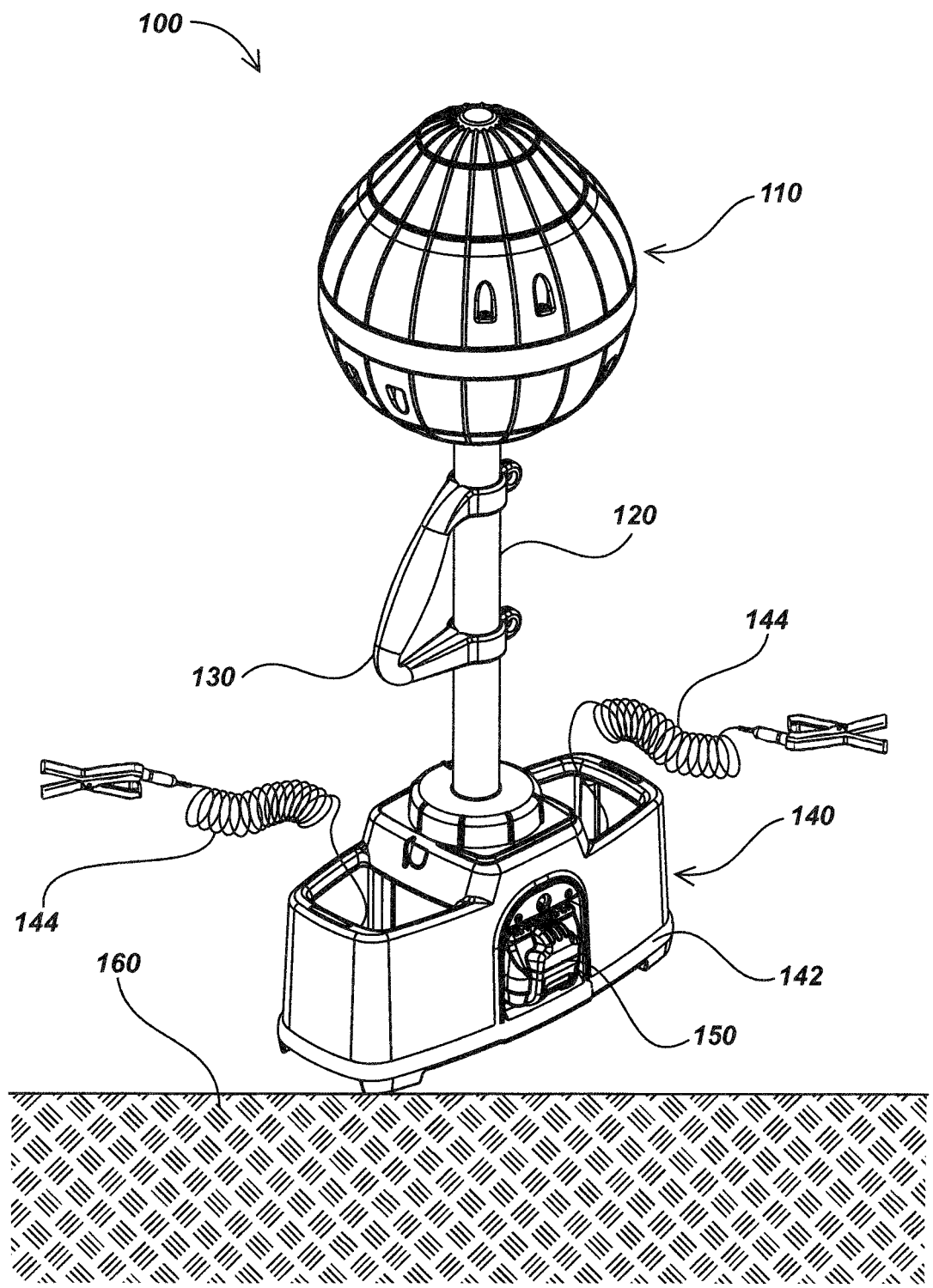
FIG. 1 is an isometric view of an embodiment of an omni-inducer device.

The present disclosure relates generally to transmitter devices for inducing signals on conductors, which are typically buried or hidden pipes, wires, cables, and the like. For example, transmitters and coupled omnidirectional antennas may be used to induce signals at one or more frequencies on conductors obscured from plain sight. Signals radiated from the conductors may then be used in conjunction with a buried object locator to determine location, depth, geographic position, mapping information, or other data or information.

In one aspect, the disclosure relates to an omnidirection electromagnetic signal inducer (omni-inducer) device used to induce signal on a conductive object, for instance a conductive pipe underground or within a building's wall. The omni-inducer device may include, for example, a transmitter element and an omnidirectional antenna element. The transmitter element may be powered, for instance, by battery, and be enabled to induce signal in one or more frequencies. The omnidirectional antenna element may include a number of coils arranged to transmit signal in all directions. In some embodiments, the transmitter element and omnidirectional antenna element may be connected by a mast.

In another aspect, the disclosure relates to a switching scheme of one or more frequencies between the coils of an omnidirectional antenna element such that each coil may cycle through each of the frequencies over a given period of time. In an exemplary embodiment, three frequencies may be used, and the frequencies may be, for instance, 7.5, 30, and 120 kHz or 30, 120, and 480 kHz.

In another aspect, the disclosure relates to a housing or transmitter module that may include a conductive undercarriage or series of foot sections. The conductive undercarriage or foot section(s) may be configured such that when the omni-inducer device is in use, the device may make capacitive coupling to the Earth's surface providing grounding to the device.

In another aspect, the disclosure relates to an omni-inducer device including a timing/positioning system such as GPS or other systems. In such embodiments, the omni-inducer device may function as a beacon to enabled locating devices, providing signaling based on timing information and synchronization with a buried object locator or other device.

In another aspect, the disclosure relates to an omni-inducer device configured to communicate with buried object locating devices ("locators") and/or other pipe mapping systems or devices. Omni-inducer devices may also include the ability to store and process information communicated by the locating device and/or mapping system.

In another aspect, disclosure relates to a system including an omni-inducer device and an enabled locator device. Such a locator device may, for instance, be enabled to communicate with an omni-inducer device with such information such as, but not limited to, timing information. Such timing information may further be used to synchronize timing of the locator device with that of the omni-inducer device. The communication may be via wired or wireless connections, such as ISM band radio links, Ethernet, Bluetooth devices, USB devices, Wi-Fi connections, or other wired or wireless connections.

In another aspect, the disclosure relates to an omnidirectional electromagnetic signal inducer (omni-inducer) device. The device may include, for example, a housing and an omnidirectional antenna node including a plurality of antenna coil assemblies. The node may be disposed on or within the housing. The device may further include one or more transmitter modules for generating ones of a plurality of output signals, which may be generated at ones of a plurality of different frequencies. The device may further include one or more control circuits. The control circuits may be configured to control the transmitters and/or other circuits to selectively switch the ones of the plurality of output signals between ones of the plurality of antenna coil assemblies. The output signals may be selectively switched within predefined time slots in the ones of a plurality of antenna coils. The housing may include a conductive base to electrically couple an output signal to the ground or other surface. Alternately, or in addition, the device may include one or more leads to electrically couple an output signal to the ground or other surface.

The antenna coil assemblies may include, for example, a single antenna coil. The plurality of single antenna coils may be configured in a substantially orthogonal orientation relative to each other. The single antenna coils may be configured in a spherical shape about a support structure assembly. Alternately, or in addition, the antenna coil assemblies may include a primary antenna coil and a secondary antenna coil to form a primary/secondary circuit. The primary antenna coils may be configured in a substantially orthogonal orientation relative to each other. Alternately, or in addition, the secondary antenna coils may be configured in a substantially orthogonal orientation relative to each other. The primary and secondary antenna coils may be configured in a spherical shape about a support structure assembly. The secondary/primary antenna coils turns ratio may be greater than one. The turns ratio may be, for example, greater than or equal to ten.

The plurality of antenna coil assemblies may, for example, comprise three substantially orthogonally oriented antenna coil assemblies. The control circuit may be configured to selectively switch an output signal at a first of the plurality of frequencies to a single antenna coil assembly of the three antenna coil assemblies during a first time slot. The control circuit may be further configured to selectively switch an output signal at a second of the plurality of frequencies to a second antenna coil assembly of the three antenna coil assemblies during the first time slot. The control circuit may be further configured to selectively switch an output signal at a third of the plurality of frequencies to the third antenna coil assembly of the three antenna coil assemblies during the first time slot. The control circuit may be further configured to selectively switch an output signal at a second of the plurality of frequencies to the single antenna coil of the three antenna coil assemblies during a subsequent slot.

In another aspect, the disclosure relates to an omni-inducer device. The device may include, for example, housing means, omnidirectional antenna means including a plurality of antenna coil assemblies, transmitter means for generating ones of a plurality of output signals at a plurality of different frequencies, and control circuit means for selectively switching the ones of a plurality of output signals between ones of the plurality of antenna coil assemblies.

In another aspect, the disclosure relates to a method for providing an omnidirectional signal for applications such as tracing buried objects. The method may include, for example, generating, in a transmitter module, a first output signal at a predefined frequency, selectively applying the first output signal, in a first time slot, to a first antenna coil assembly of an omnidirectional antenna node including a plurality of antenna coil assemblies, generating, in the transmitter module, a second output signal at the predefined frequency, and selectively applying the second output signal, in a second time slot subsequent to the first time slot, to a second antenna coil assembly of the omnidirectional antenna node.

The method may further include, for example, generating, in the transmitter module, a third output signal at a second predefined frequency, and selectively applying the third output signal, in the first time slot, to the second antenna coil assembly of the omnidirectional antenna node. The method may further include generating, in the transmitter module, a fourth output signal at a third predefined frequency, and selectively applying the fourth output signal, in the first time slot, to a third antenna coil assembly of the omnidirectional antenna node. The method may further include generating, in the transmitter module, a third output signal at a second predefined frequency, and selectively applying the third output signal, in a third time slot subsequent to the first time slot, to the first antenna coil assembly of the omnidirectional antenna node.

The method may further include, for example, generating, in the transmitter module, a fourth output signal at a third predefined frequency, and selectively applying the fourth output signal, in a fourth time slot subsequent to the first time slot, to the first antenna coil assembly of the omnidirectional antenna node. The method may further include generating, in the transmitter module, a third output signal at a second predefined frequency, selectively applying the third output signal, in the first time slot, to the second antenna coil assembly of the omnidirectional antenna node, generating, in the transmitter module, a fourth output signal at a third predefined frequency, and selectively applying the third output signal, in the first time slot, to a third antenna coil assembly of the omnidirectional antenna node. The second predefined frequency may be larger than the first predefined frequency and the third predefined frequency is larger than the second predefined frequency. The second predefined frequency may be an integer multiple of the first predefined frequency. The third predefined frequency may be an integer multiple of the second predefined frequency.

The antenna coil assemblies may include, for example, a single antenna coil. The plurality of single antenna coils may be configured in a substantially orthogonal orientation relative to each other. The single antenna coils may be configured in a spherical shape about a support structure assembly. Alternately, or in addition, the antenna coil assemblies may include a primary antenna coil and a secondary antenna coil. The primary antenna coils may be configured in a substantially orthogonal orientation relative to each other. The secondary antenna coils may be configured in a substantially orthogonal orientation relative to each other. The primary and secondary antenna coils may be configured in a spherical shape about a support structure assembly. A secondary/primary antenna coils turns ratio may be greater than one. The turns ratio may be greater than or equal to ten.

The plurality of antenna coil assemblies may, for example, include three substantially orthogonally oriented antenna coil assemblies. The output signals may be selectively switched by a control circuit configured to selectively switch an output signal at a first of a plurality of frequencies to the first antenna coil assembly of the plurality of antenna coil assemblies during the first time slot.

The method may further include receiving, from a timing system receiver device, a timing reference signal, and synchronizing transmissions in the time slots to the timing reference signal. The method may further include synchronizing the phase of the output signals to the timing reference. The timing reference may be received from a satellite position system. The satellite position system may be a GPS or GLONASS system. The timing reference signal may be received from a terrestrial timing information transmission system, such as dedicated terrestrial radio timing system or a cellular data system or other system. The timing reference signal may be received from a buried object locator or other user device. The timing reference may be generated in coordination through a wired or wireless connection with a buried object locator or other user device. The buried object locator and device may have a synchronized timing reference, such as to 100 microseconds or better synchronicity. The connection between the device and the buried object locator or other user device may be an ISM radio band wireless connection or other wired or wireless connection, such as an Ethernet or USB connection or a Wi-Fi or Bluetooth connection.

In another aspect, the disclosure relates to a processor-readable medium. The medium may include instructions for causing a computer to initiate or control one or more of the following processing steps: generating, in a transmitter module, a first output signal at a predefined frequency, selectively applying the first output signal, in a first time slot, to a first antenna coil assembly of an omnidirectional antenna node including a plurality of antenna coil assemblies, generating, in the transmitter module, a second output signal at the predefined frequency, and selectively applying the second output signal, in a second time slot subsequent to the first time slot, to a second antenna coil assembly of the omnidirectional antenna node.

Various additional aspects, features, and functions are described below in conjunction with FIGS. 1 through 15 of the appended Drawings.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Omni-Inducer Devices and Systems for Use in Buried Object Locating Systems Turning to FIG. 1, one embodiment of an omni-inducer device in accordance with certain aspects is illustrated. As shown in FIG. 1, omni-inducer device 100 may include an omni-inducer node assembly 110, a mast 120 or other body or housing assembly, with an optional handle 130 attached thereto, and a transmitter module 140, that may be powered by a battery 150 and/or by line power (not shown).

Device 100 may include electrical leads and/or a conductive base assembly to provide an electrical ground contact to conductive surfaces, such as conductive soils, etc. In an exemplary embodiment, a conductive base assembly 142 may be included on the bottom of the transmitter 140 that, when in use, makes physical contact with the Earth's surface 160 and may provide grounding to the omni-inducer device 100. The base assembly may be made from or coated in a conductive material and may have conductive stubs or feet, such as the four feet shown in base assembly 142 of FIG. 1, to allow the device to sit in a stable fashion on uneven ground or other surfaces. Conductive coatings may be used to reduce weight over metal components in some embodiments. A capacitive coupling to the Earth's surface 160 may be achieved by using electrically conductive materials for the base assembly 142. These materials may include, for example, conductive plating materials, conductive paints, conductive rubber materials, and/or a combination of aforementioned materials.

Omni-inducer devices such as embodiment 100 may be battery powered. For example, in an exemplary embodiment, the battery may be a battery configured the same as or similarly to those disclosed in U.S. Provisional Patent Application Ser. No. 61/521,262 entitled MODULAR BATTERY PACK APPARATUS, SYSTEMS, AND METHODS filed Aug. 8, 2011, the content of which is incorporated by reference herein in its entirety.

In operation, the transmitter module 140 generates antenna coil drive signals at one or more frequencies and a control circuit, which may be incorporated in the transmitter module 140 and/or may be separately located, such as in a separate module or assembly, selectively applying the drive signals to a plurality of coils of antenna node assembly, where radiated magnetic fields may then be coupled to the buried objects. This may be done using, for example, a controlled switching circuit to direct output signals to respective antenna coils such as are shown and described subsequently herein with respect to FIGS. 15A to 15F. Additional details of example operation of omni-inducer devices and associated locators is described subsequently herein.

Figure 2:
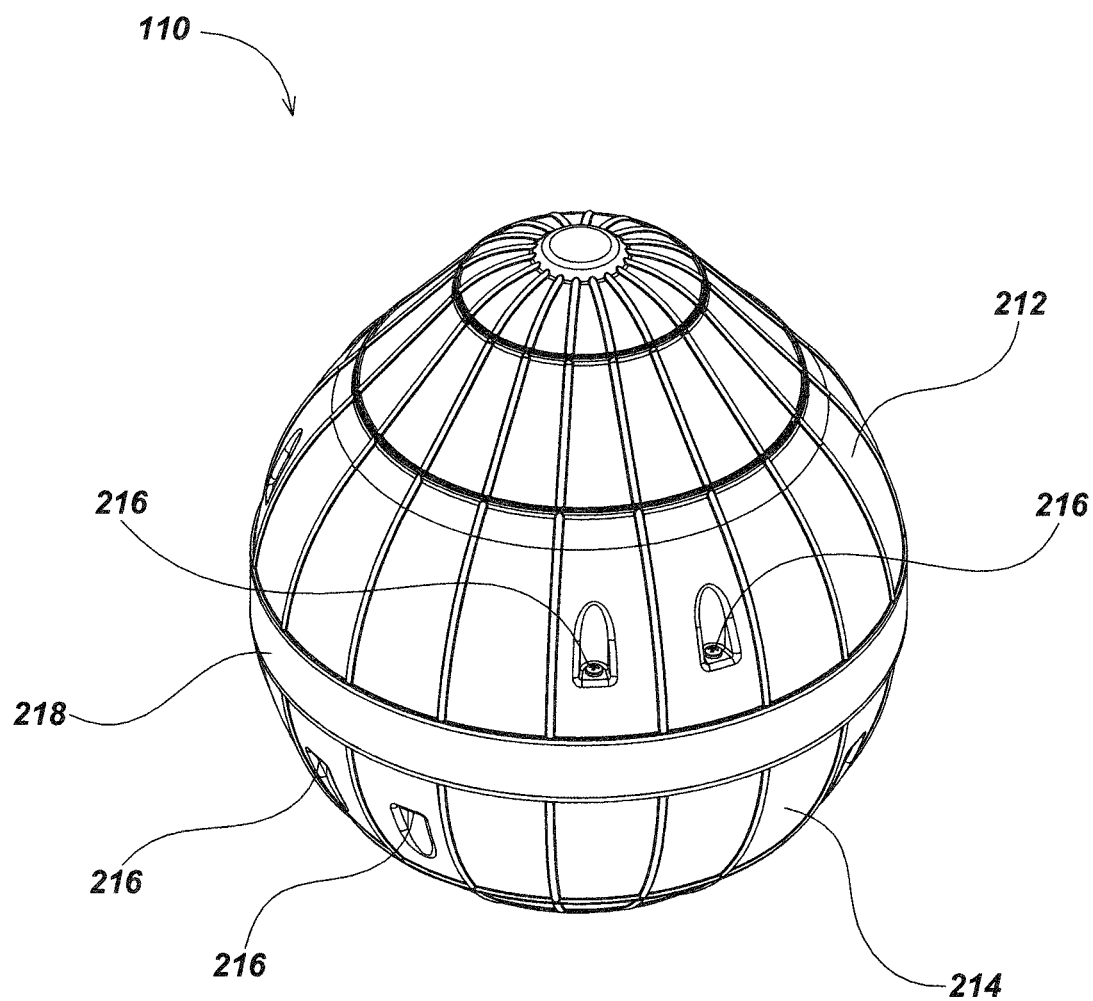
FIG. 2 is a detailed isometric view of an embodiment of an omni-inducer node assembly.

In FIG. 2, the omni-inducer node assembly 110 may externally include a top shell half 212 and a bottom shell half 214. In an exemplary embodiment, the top shell half 212 and the bottom shell half 214 may be largely hemispherical in shape as shown and be formed to mate and be secured together by a series of shell screws 216. Equatorial sealing tape 218 may secure around about the circumference of the omni-inducer node assembly 110 where, in assembly, the top shell half 212 and the bottom shell half 214 meet. Within the shell assembly, a plurality of antenna coil assemblies, which may be arranged substantially orthogonally, may be housed and mounted, along with other antenna elements, such as GPS antennas, ISM antennas, or other antennas, and, in some embodiments, other modules or circuits, such as GPS sensors, control and/or switching circuits, ISM radio modules, and the like.

Figure 3:
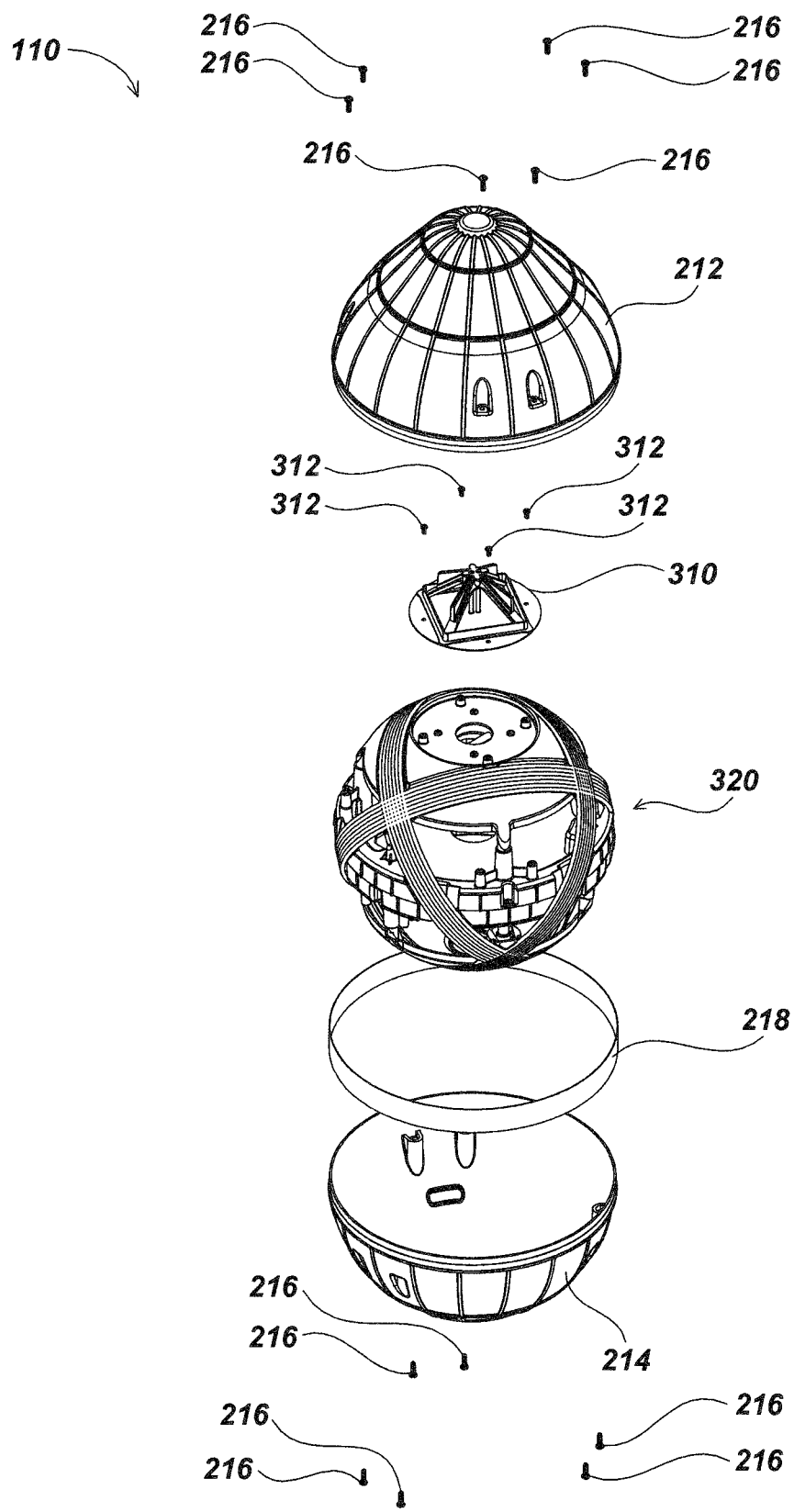
FIG. 3 is a top down exploded view of the omni-inducer node assembly embodiment of FIG. 2.
Figure 4:
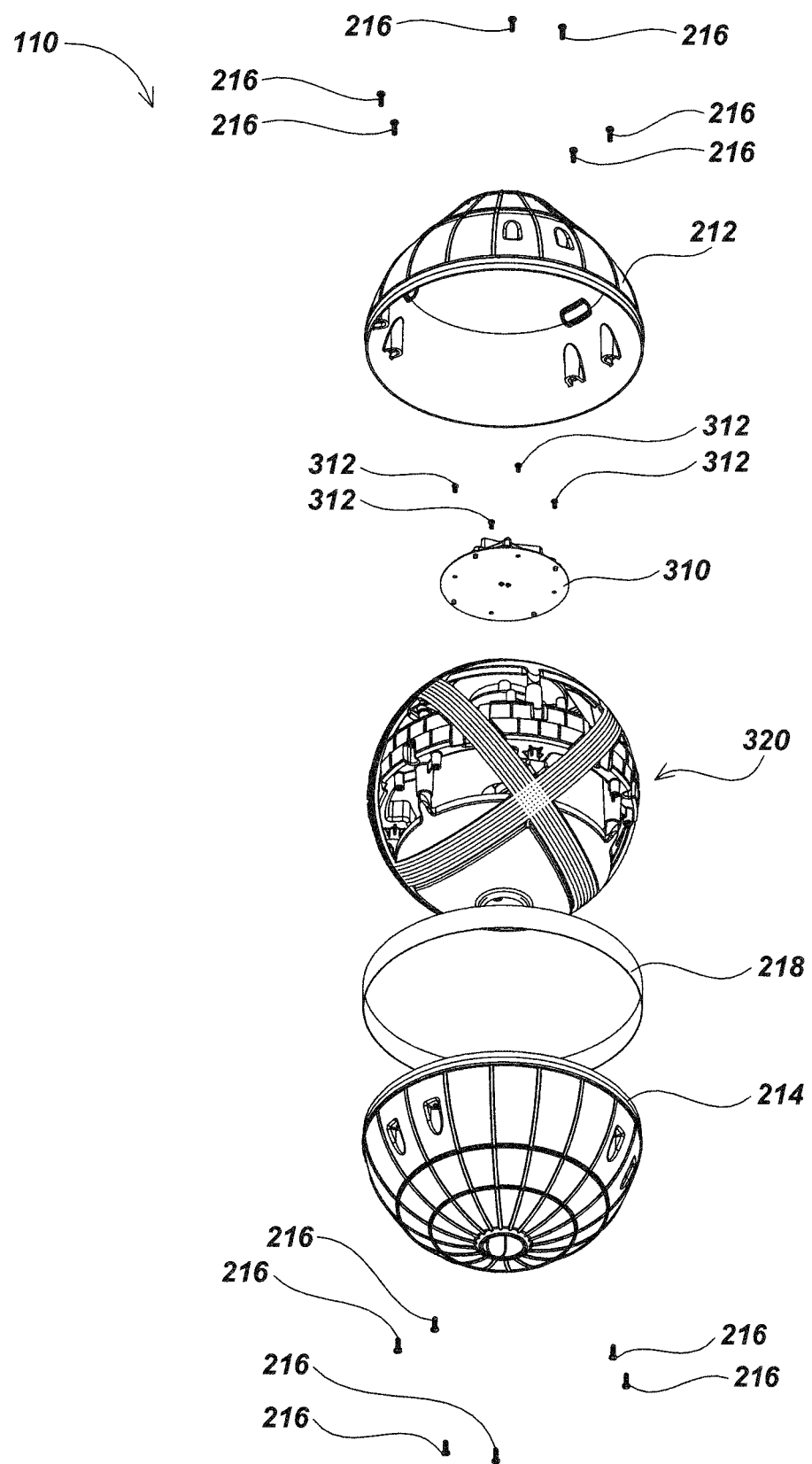
FIG. 4 is a bottom up exploded view of the omni-inducer node assembly embodiment of FIG. 2.

Turning to FIGS. 3 and 4, the omni-inducer node assembly 110 may include an omni-inducer antenna assembly and, optionally, a location positioning subsystem, such as a GPS antenna 310, a GPS module (e.g., a GPS receiver and signal processing module to generate output data related to time, position, and/or other GPS parameters), and/or Instrumentation, Scientific, and Measurement (ISM) radio antennas and receiver/transmitter modules. The GPS antennas and/or modules may alternately be disposed on or within the transmitter module or on the body of the device, such as on the mast 120 (FIG. 1).

When equipped with a positioning system, including components such as the GPS antenna 310 and a corresponding GPS sensor module (not shown), an omni-inducer device such as omni-inducer embodiment 100 may be enabled to function as a beacon to enabled locating devices and/or pipe mapping systems. For example, for location and mapping operations, operation of the omni-inducer may be coordinated with a buried object locator device, such as by communicating between the devices using ISM antennas and modules, cellular or other data communication links, wired communication links, and/or by coordinated, synchronized timing, such as may be obtained from GPS or other timing device modules in the omni-inducer and/or locator. For example, by coordinating timing and transmit signal characteristics, the locator may have improved performance by knowing when to expect a particular signal from a buried object at a particular frequency. Received information may also be used to determine orientation of the buried object, location information, and/or other information associated with the buried object.

Some example locators and associated configurations and functions are described in co-assigned patents and patent applications including U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S. Provisional Patent Application Ser. No. 61/618,746, entitled DUAL ANTENNA SYSTEMS WITH VARIABLE POLARIZATION, filed Mar. 31, 2012, U.S. patent application Ser. No. 13/570,211, entitled PHASE-SYNCHRONIZED BURIED OBJECT LOCATOR APPARATUS, SYSTEM, AND METHODS, filed Aug. 8, 2012, U.S. patent application Ser. No. 13/469,024, entitled BURIED OBJECT LOCATOR APPARATUS AND SYSTEMS, filed May 10, 2012, U.S. patent application Ser. No. 13/676,989, entitled QUAD-GRADIENT COILS FOR USE IN A LOCATING SYSTEM, filed Nov. 11, 2012, and U.S. Provisional Patent Application Ser. No. 61/485,078, entitled LOCATOR ANTENNA CONFIGURATION, filed on May 11, 2011. The content of each of these applications is incorporated by reference herein in its entirety (These applications may be collectively denoted herein as the "incorporated applications."). Locator incorporating apparatus, systems, and methods as described in these applications, as well as other compatible locator devices, may be used in coordination with omni-inducer embodiments such as are described herein to improve locator performance and make location determination more efficient, thorough, and/or more accurate.

For example, when operating as a beacon, positional information associated with the locating device may be determined in relation to the omni-inducer device and utilized in mapping of the target utility (e.g., buried object, etc.). A series of GPS antenna screws 312 may be used to secure the GPS antenna 310 to the top of the omni-inducer antenna assembly 320.

Figure 5:
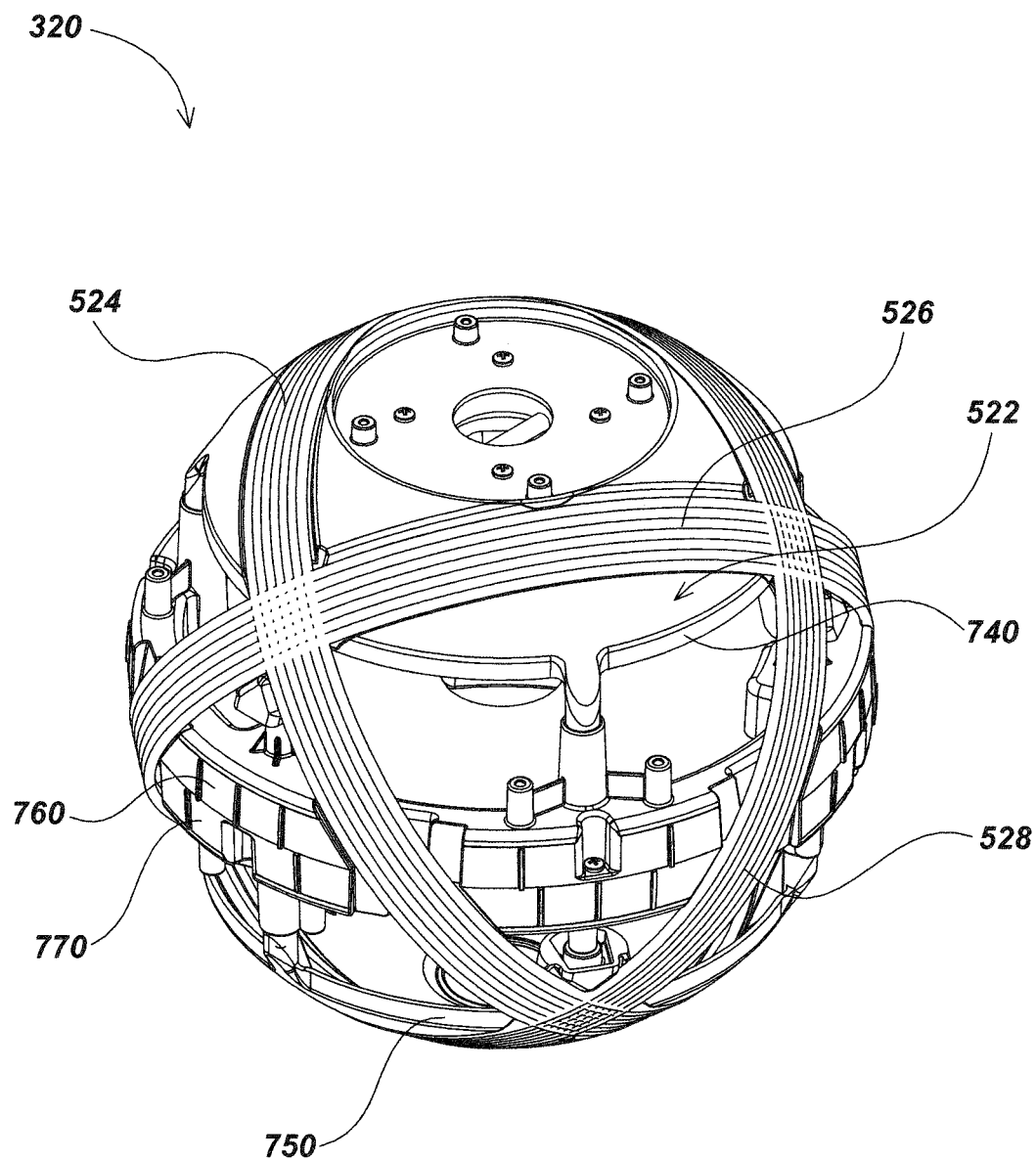
FIG. 5 is a detailed isometric view of an embodiment of an omni-inducer antenna assembly of FIGS. 3 and 4.
Figure 6:
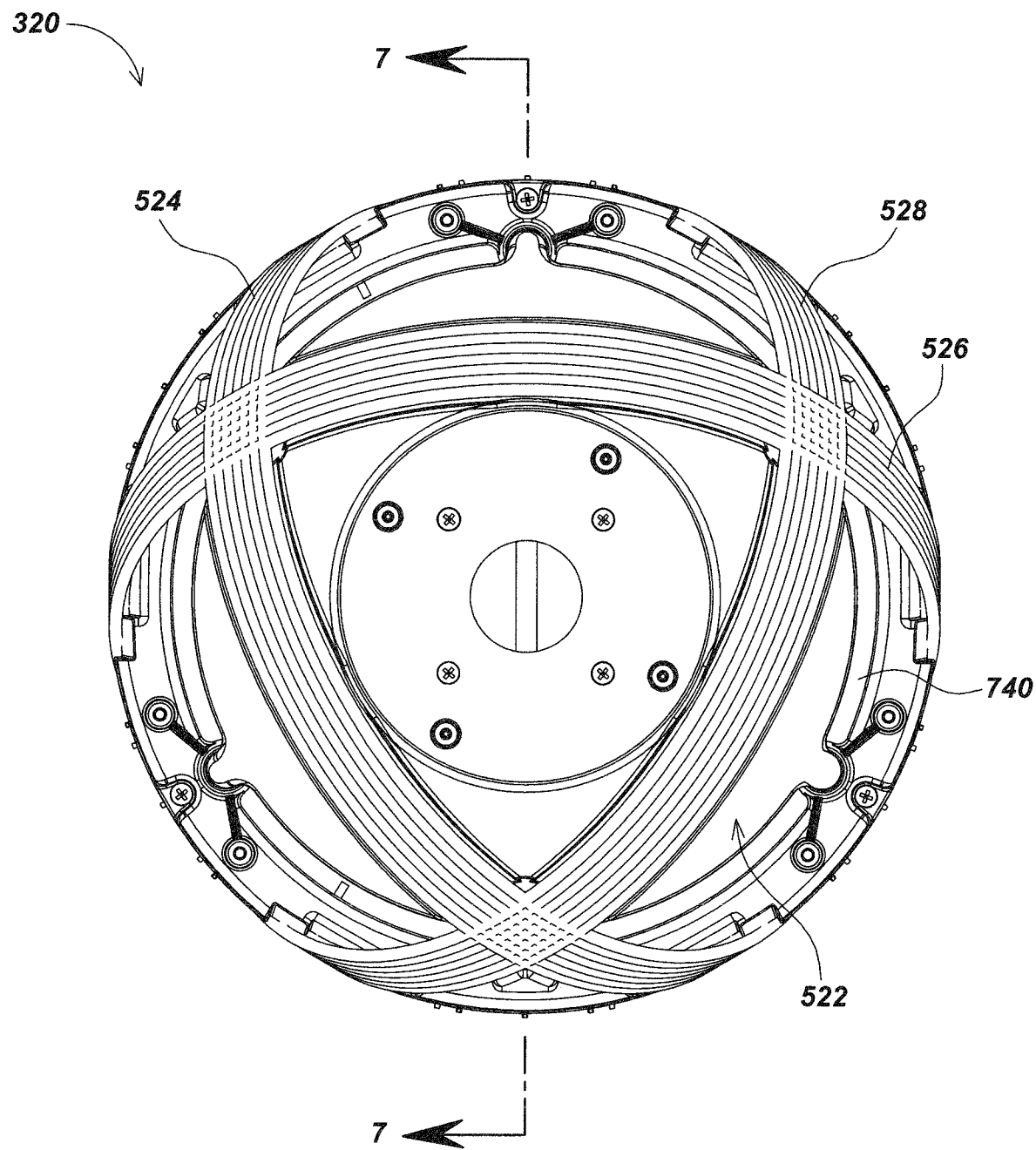
FIG. 6 is a top view of an omni-inducer antenna assembly embodiment of FIGS. 3-5.

Referring to FIGS. 5 and 6, the omni-inducer antenna assembly embodiment 320 may contain a support structure assembly 522 around which may be located a plurality of antenna coil assemblies. In some embodiments, these may be single antenna coils and they may be configured in a substantially orthogonal orientation. For example, three antenna coils may be arranged as shown in FIG. 5 in a spherical substantially orthogonal shape. In other embodiments, the antenna coil assemblies may include a primary coil and a magnetically coupled second coil, functioning as a step-up transformer. This may be done to generate higher currents in the secondary coil, thereby generating higher magnetic fields for coupling to the buried objects than is typically obtained in a single coil configuration.

For example, as shown in FIG. 5, an antenna coil assembly may include a first primary antenna coil 526, a second primary antenna coil 524, and a third primary antenna coil 528 that may be arranged substantially orthogonally to each other about the support structure assembly 522. Each primary antenna coil may be electrically isolated from the other primary antenna coils. As described subsequently herein, it is generally desirable to make the coils orthogonal or close to orthogonal to avoid cross-coupling of signals between the coils during operation, which can result in output magnetic field distortion. However, in some embodiments, to the extent that cross-coupling is utilized to generate the output signals and/or can be controlled, the coils need not necessarily be orthogonal. The primary coils may comprise windings of Litz wire or other comparable conductive material so as to reduce skin-effect losses at higher frequencies of operation. In some embodiments, the coils may be oriented at substantially equal angles to the supporting mast 120.

Figure 7:
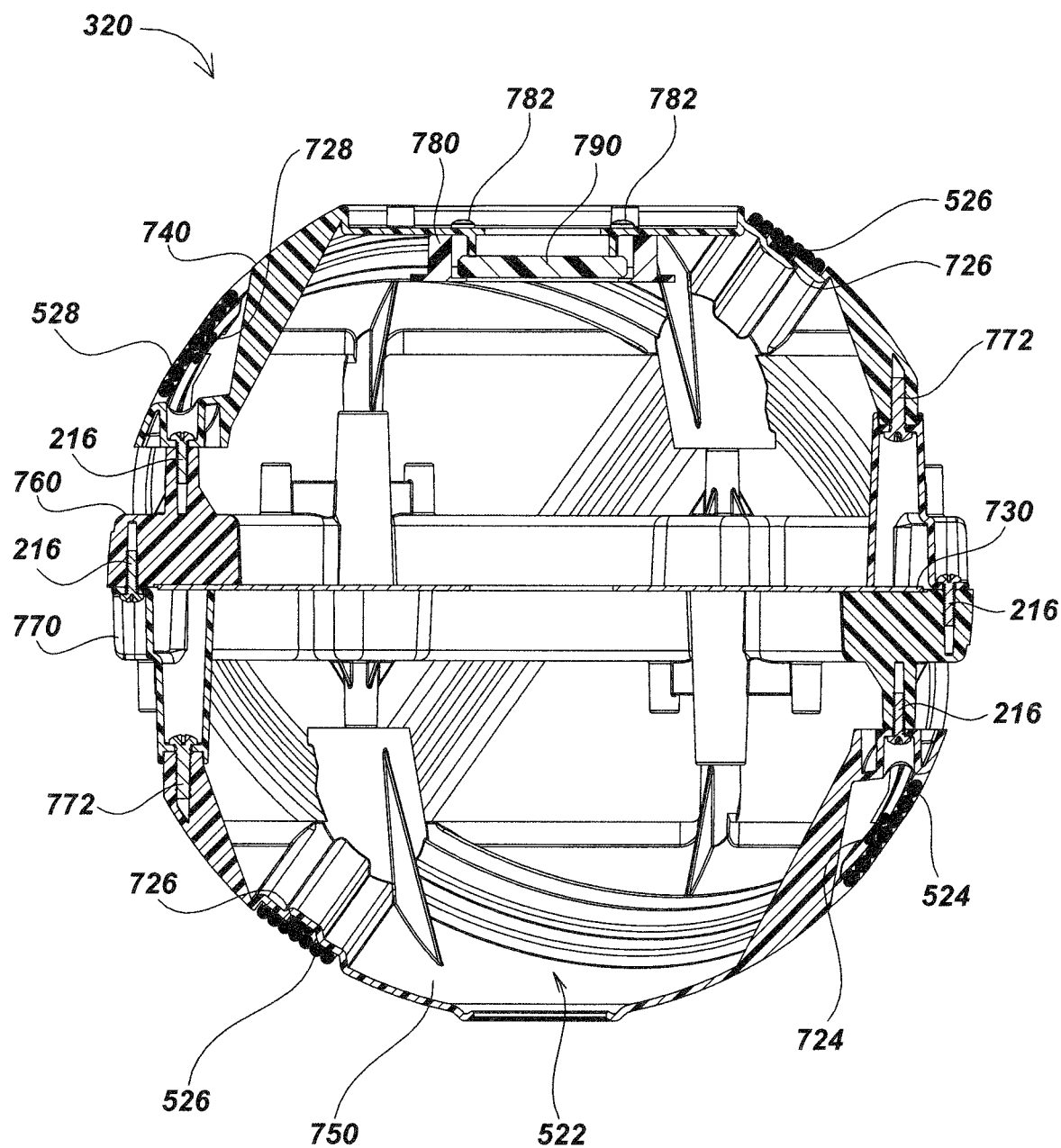
FIG. 7 is a section view of the omni-inducer antenna assembly embodiment of FIGS. 3-6, taken along line 7-7 of FIG. 6.
Figure 8:
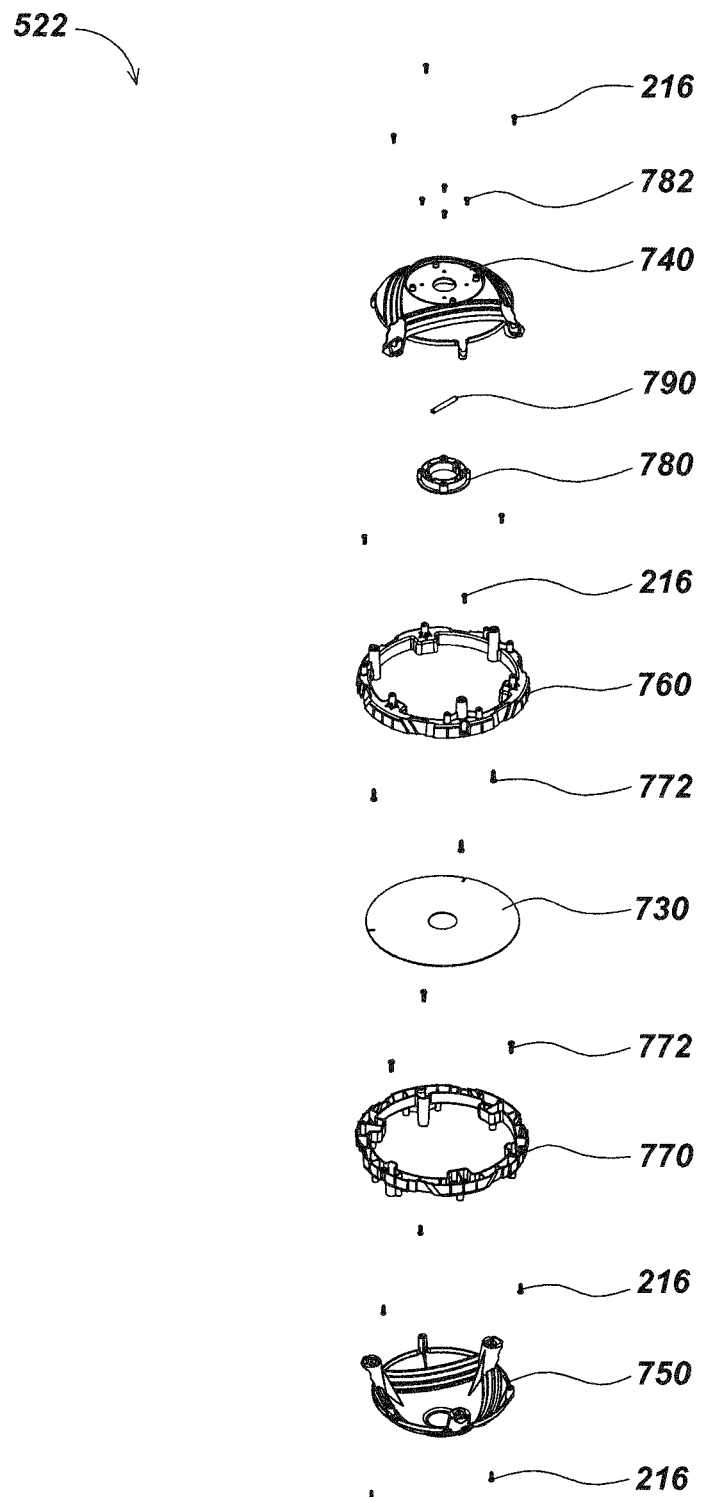
FIG. 8 is a top down exploded view of an omni-inducer antenna assembly embodiment of FIGS. 3-7.
Figure 12:
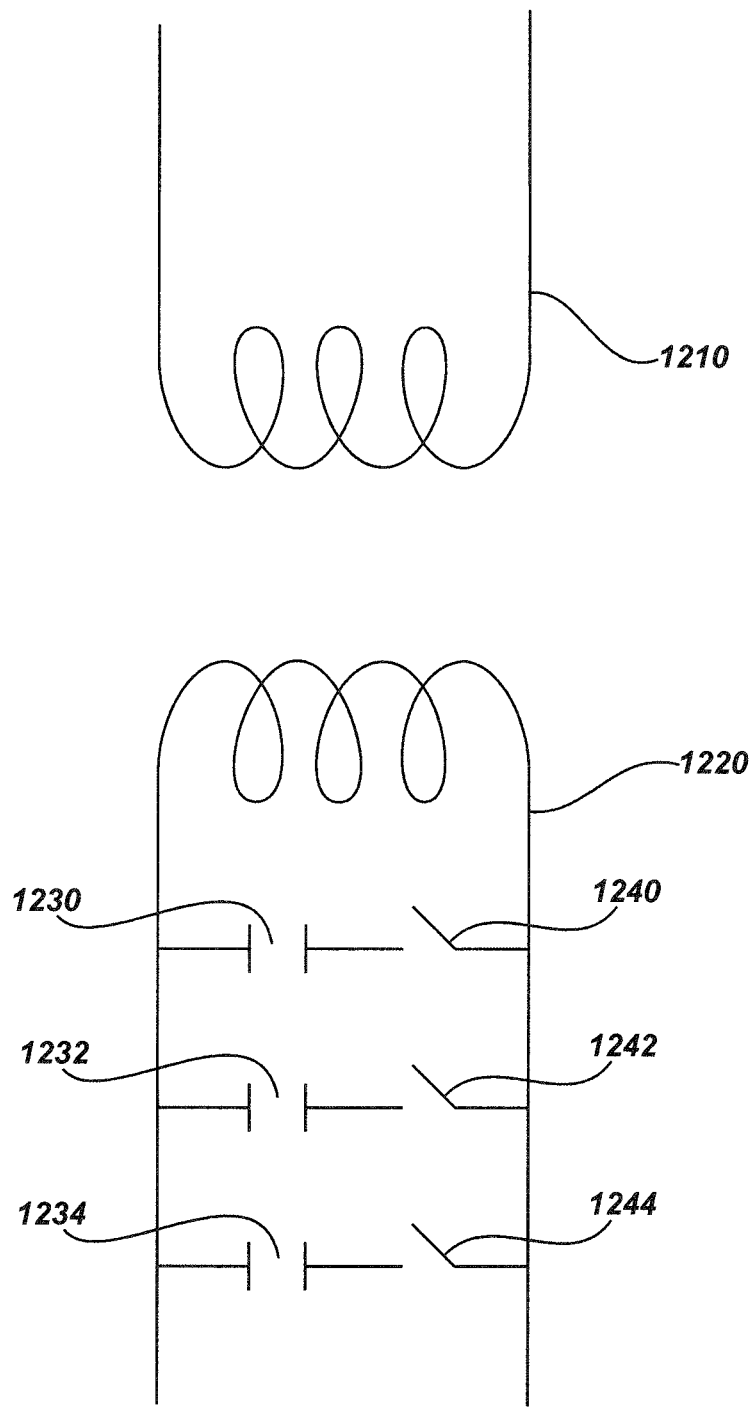
FIG. 12 is a schematic illustrating a plurality of circuit elements.

Turning to FIGS. 7 and 8, a series of secondary antenna coils may be centered under each set of primary antenna coils to function as secondary windings in a primary/secondary configuration. The relationship between primary and secondary antenna coils may be further illustrated in connection with FIG. 12. In some embodiments, such as illustrated in FIG. 12, each antenna coil may consist of primary and secondary antenna coils. In other embodiments, just direct excitation windings may be used. Litz wire or other comparable conductive material may also be used in each of the secondary antenna coils. In an exemplary embodiment, there may be a first secondary antenna coil 724 centrally located under the first primary antenna coil 524, a second secondary antenna coil 726 centrally located under the second primary antenna coil 526, and a third secondary antenna coil 728 centrally located under the third primary antenna coil 528.

A circuit element, such as an omni-inducer printed circuit board (PCB) 730, may be horizontally seated about the equator of the omni-inducer antenna assembly 320 to provide electrical connection and control circuitry. The control circuitry may include a processing element and associated analog and digital components, such as solid state switches, signal generators, filters, and the like to generate output signals and control provision of the output signals to the antenna coil assemblies.

The support structure 522 may include a coil retainer top piece 740 and a coil retainer bottom piece 750. The coil retainer top 740 may attach to an upper PCB mount 760 and the coil retainer bottom 750 may attach to a lower PCB mount 770 and be secured by a series of PCB mount screws 772. The omni-inducer PCB 730 may be secured between the upper PCB mount 760 and the lower PCB mount 770. A mast retainer piece 780 may be secured to the underside of the top section of the coil retainer top 740 by a series of mast retainer screws 782. The mast retainer piece 780 may be formed to allow the top of the mast 120, illustrated in FIG. 1, to snugly fit within a hole formed centrally through the mast retainer piece 780. The mast 120 (FIG. 1) may further be secured to the mast retaining piece 780 by a mast retaining pin 790, anchoring the tube of the mast 120 (FIG. 1) to the omni-inducer antenna assembly 320.

In operation, an output signal, in the form of a drive current, may be selectively provided to the windings of the first primary antenna coil 524, thereby inducing voltage and current flow, out of phase and at higher levels than in the primary coil, in the first secondary antenna coil 724. Corresponding controlled current applied to the windings of the second primary antenna coil 526 may induce voltage and current flow in the second secondary antenna coil 726, and current in the windings of the third primary antenna coil 528 may induce voltage in the third secondary antenna coil 728. In effect, the combination of a primary antenna coil and a secondary antenna coil may act as a step-up transformer producing a high voltage and high current in the secondary antenna coil dependent on the number of windings and wire diameters and kinds employed.

A control module including control circuitry (not shown) may be used to selectively switch currents generated in the transmitter between the coil assemblies of the nodes at one or more frequencies. For example, current may be switched to the first primary antenna coil 524, the second primary antenna coil 526 and the third primary antenna coil 528 under the control of control circuitry mounted on the omni-inducer PCB 730 at selected frequencies. The frequency used in a primary antenna coil will be inducted into the secondary antenna coil beneath it. The use of Litz wire for both primary and secondary antenna coil windings serves to increase the Q factor, and the resonance of the secondary coil may be tuned to a particular targeted frequency by varying capacitance, such as by selectively switching capacitors in and out of the second coil circuits, through use of a variable capacitor device, such as a Variac, or by other capacitive adjustment devices known or developed in the art.

One example of such a switching scheme, as may be implemented in a control module of the omni-inducer device, is illustrated in Table 900 of FIG. 9A. In Table 900, it is assumed that three antenna coil assemblies, in a substantially orthogonal configuration, are used, and three frequencies are transmitted for a single time interval or slot of 200 milliseconds (ms), followed by a pause in transmission of 100 ms. It is noted that these time values are for purposes of illustration only and are not in any way intended to be limiting. The frequencies applied to the coils are then shifted, and the three frequencies are again transmitted for a second time interval, from different antenna coil assemblies. Three transmitting antenna coils, using three frequencies, provide nine channels in this exemplary frequency switching scheme. The switching scheme illustrated in Table 900 utilizes the 30, 120, and 480 kHz frequencies. In alternative embodiments, other frequencies may also be used. Alternative frequencies may include 7.5, 30, and 120 kHz as illustrated in Table 902 of FIG. 9B.

In embodiments using secondary coils and capacitors (as shown and described subsequently with respect to FIG. 12), where sufficient energy is stored in the capacitors, such as, for example, by selecting the slot sizes based on the applied frequencies so that transitions occur at or near zero in the current, an alternative frequency switching scheme may be used where little to no off time (e.g., the 100 ms slots as shown in FIGS. 9A and 9B) in transmission are needed. For example, as illustrated in FIG. 13A, the alternative frequency switching scheme illustrated in Table 1300 may result in a faster switching of frequencies and little to no delay or off time. The switching scheme illustrated in Table 1300 utilizes the 30, 120, and 480 kHz frequencies. In alternative embodiments, other frequencies may also be used. Alternative frequencies may include 7.5, 30, and 120 kHz as illustrated in Table 1302 of FIG. 13B.

Figure 10:
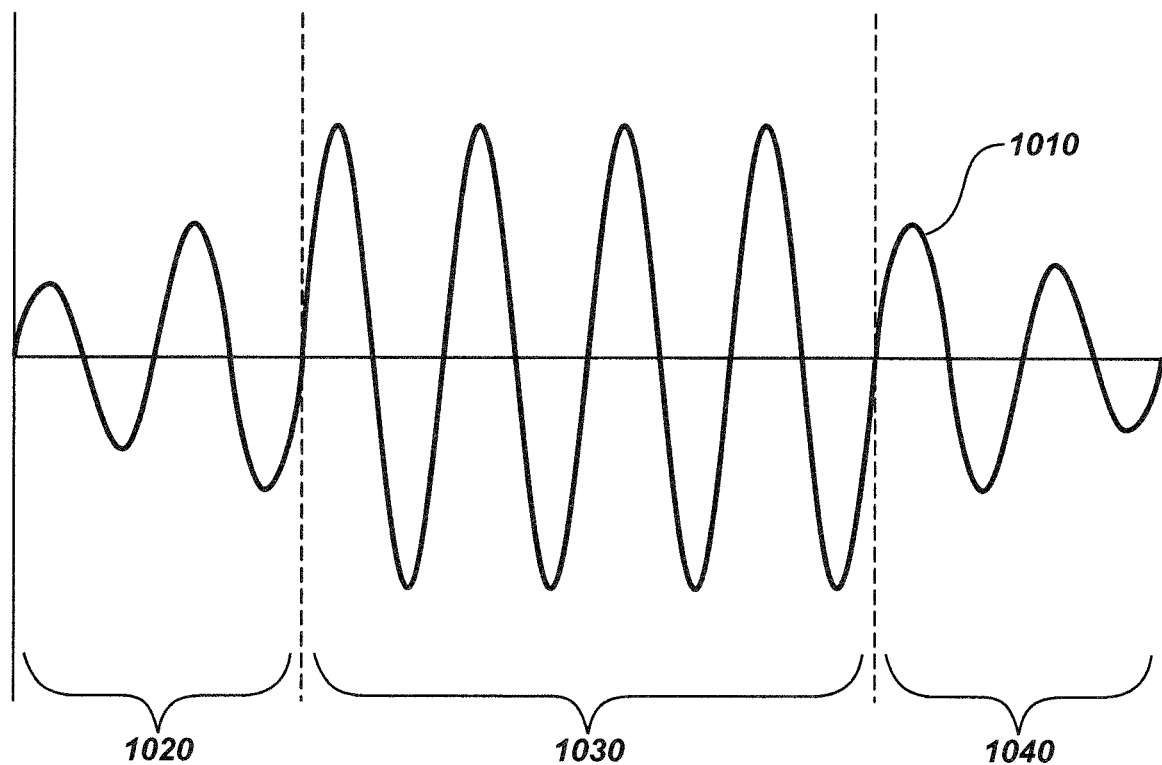
FIG. 10 is a diagram of an embodiment of a single waveform associated with one corresponding frequency.

Turning to FIG. 10, an illustration of an example current flow in a secondary antenna coil (of a primary/secondary coil pair) is shown. When current is induced into the coils for each particular frequency, such as frequency waveform 1010, a ramping up interval 1020 may occur prior to reaching an interval of full amplitude 1030. Once current is removed from the coils, a ramping down interval 1040 may also occur. The ramping up intervals 1020 and the ramping down intervals 1040 may occur during the pauses in transmission as illustrated in Table 900 of FIG. 9A and Table 902 of FIG. 9B. The interval of full amplitude 1030 may, for instance, occur during the 200 millisecond intervals of transmission in the switching scheme illustrated in Table 900 of FIG. 9A or Table 902 of FIG. 9B.

Figure 11:
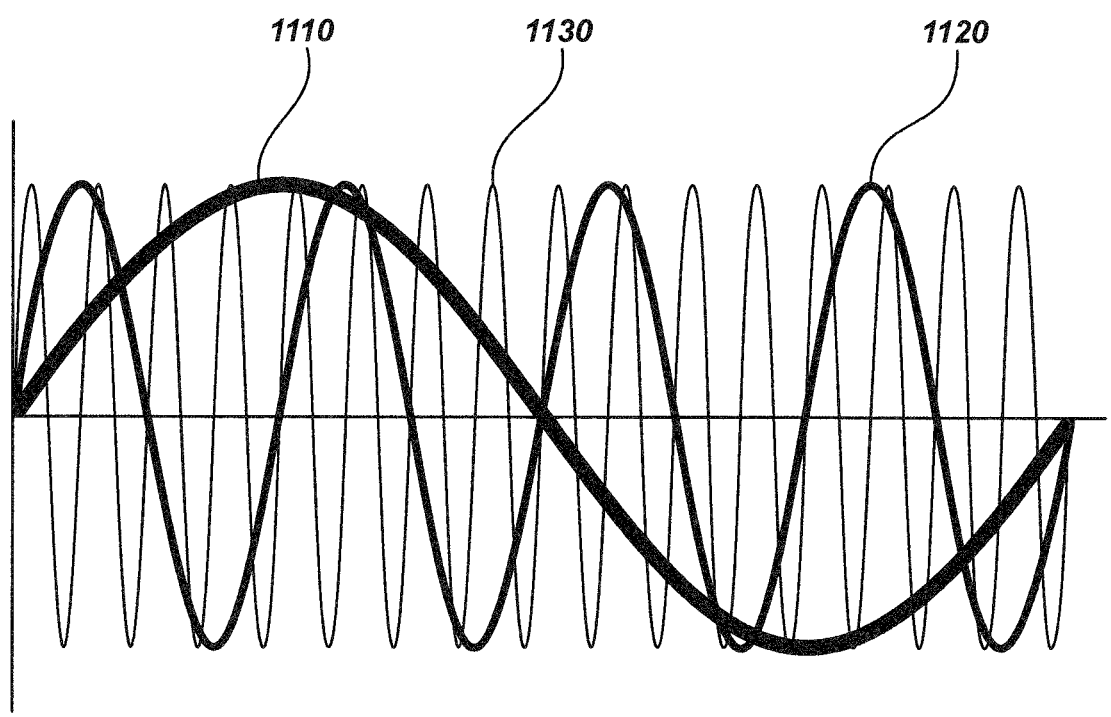
FIG. 11 is a diagram of an embodiment of three waveforms associated with three corresponding frequencies.

Once reaching an interval of full voltage amplitude for each, switching of the frequencies may occur at the following shared point of minimum current in all frequencies. For example, if the driving frequency and tuning of the secondary circuit are switched at minimum current, the stored voltage on the capacitors of the secondary circuit will be at or near a maximum value, and therefore the circuit will begin oscillating at the newly switched and tuned frequency quickly after the switching event. As illustrated in FIG. 11, the 30 kHz frequency 1110, the 120 kHz frequency 1120, and the 480 kHz frequency 1130 may first be transmitted when there is a synchronized rising edge on each frequency following a point of minimum current.

In FIG. 12, an example simplified schematic illustrates one embodiment of a circuit including a primary antenna coil 1210 and a secondary antenna coil 1220. The secondary antenna coil 1220 may have a series of capacitors connected thereto where each capacitor may tune the inductor/capacitor circuit to a particular frequency corresponding with the frequency of a driving signal in the primary antenna coil. For example, a first frequency capacitor 1230 may be tuned to 30 kHz, a second frequency capacitor 1232 may be tuned to 120 kHz, and a third frequency capacitor 1234 may be tuned to 480 kHz. Each capacitor may have a corresponding switch, such that a first frequency switch 1240 may correspond to the first frequency capacitor 1230, a second frequency switch 1242 may correspond to a second frequency capacitor 1232, and a third frequency switch 1244 may correspond to a third frequency capacitor 1234. When a switch is opened, the secondary circuit will resonate at the tuned frequency and generate a magnetic field at the tuned frequency (e.g., based on the capacitor switch settings). For example, when the first frequency switch 1240 is closed the 30 kHz frequency associated with the first frequency capacitor 1230 may be transmitted, when the second frequency switch 1242 is closed the 120 kHz frequency associated with the second frequency capacitor 1232 may be transmitted, and when the third frequency switch 1244 is closed the 480 kHz frequency associated with the third frequency capacitor 1234 may be transmitted. In one embodiment, only one switch may be opened at a time, and a switching sequence, such as that illustrated in Table 900 of FIG. 9A or Table 902 of FIG. 9B, may be implemented. In other embodiments, various ways of tuning the secondary circuit may be used. For example, variable capacitor devices may be used alone or in combination with switching of fixed capacitors, or other tunable circuits may be used to vary the tuned frequency of the secondary coil 1220.

Figure 15A:
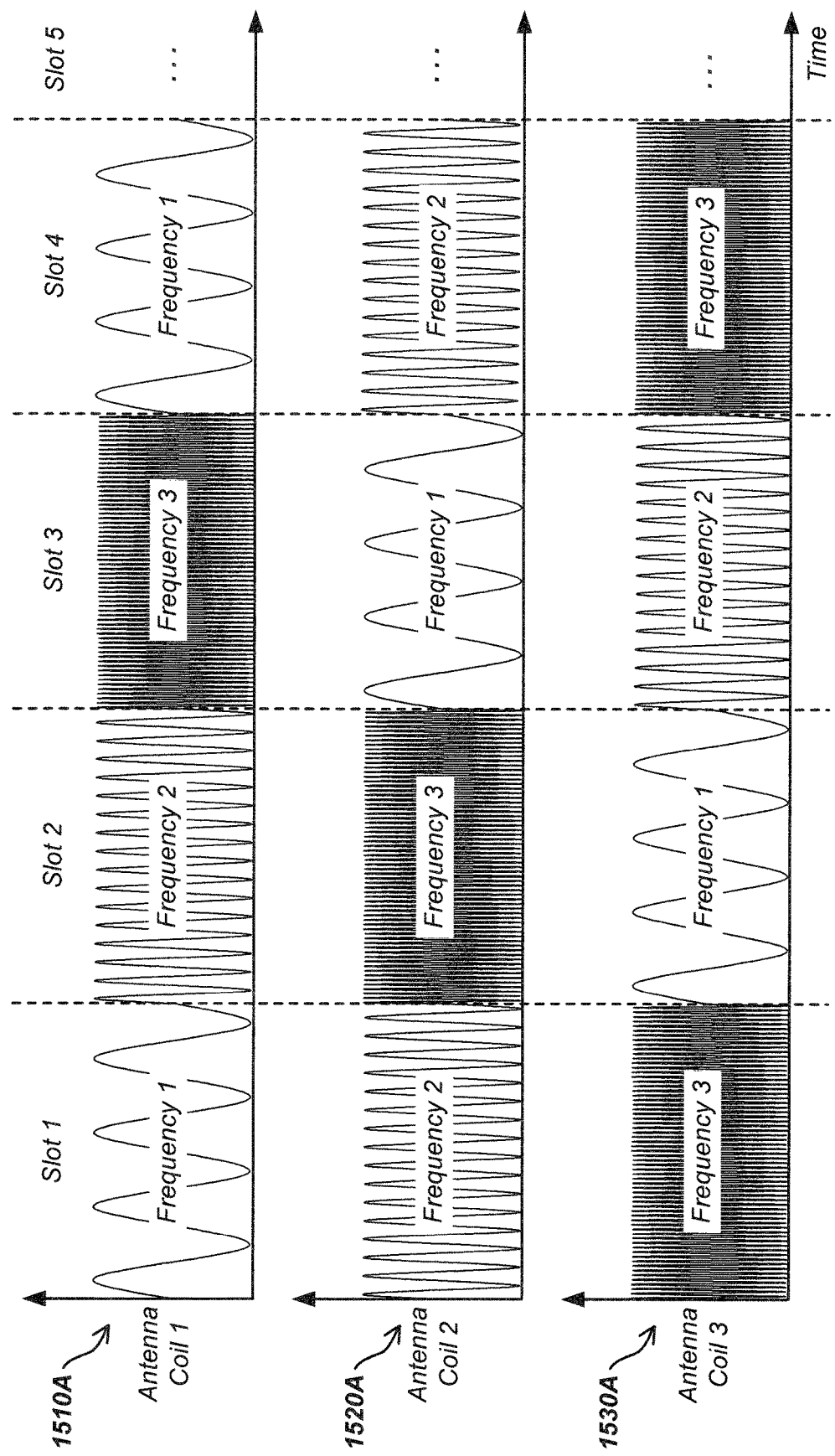
FIGS. 15A-15F illustrates details of example embodiments of switched output signals in an omni-inducer device.
Figure 15B:
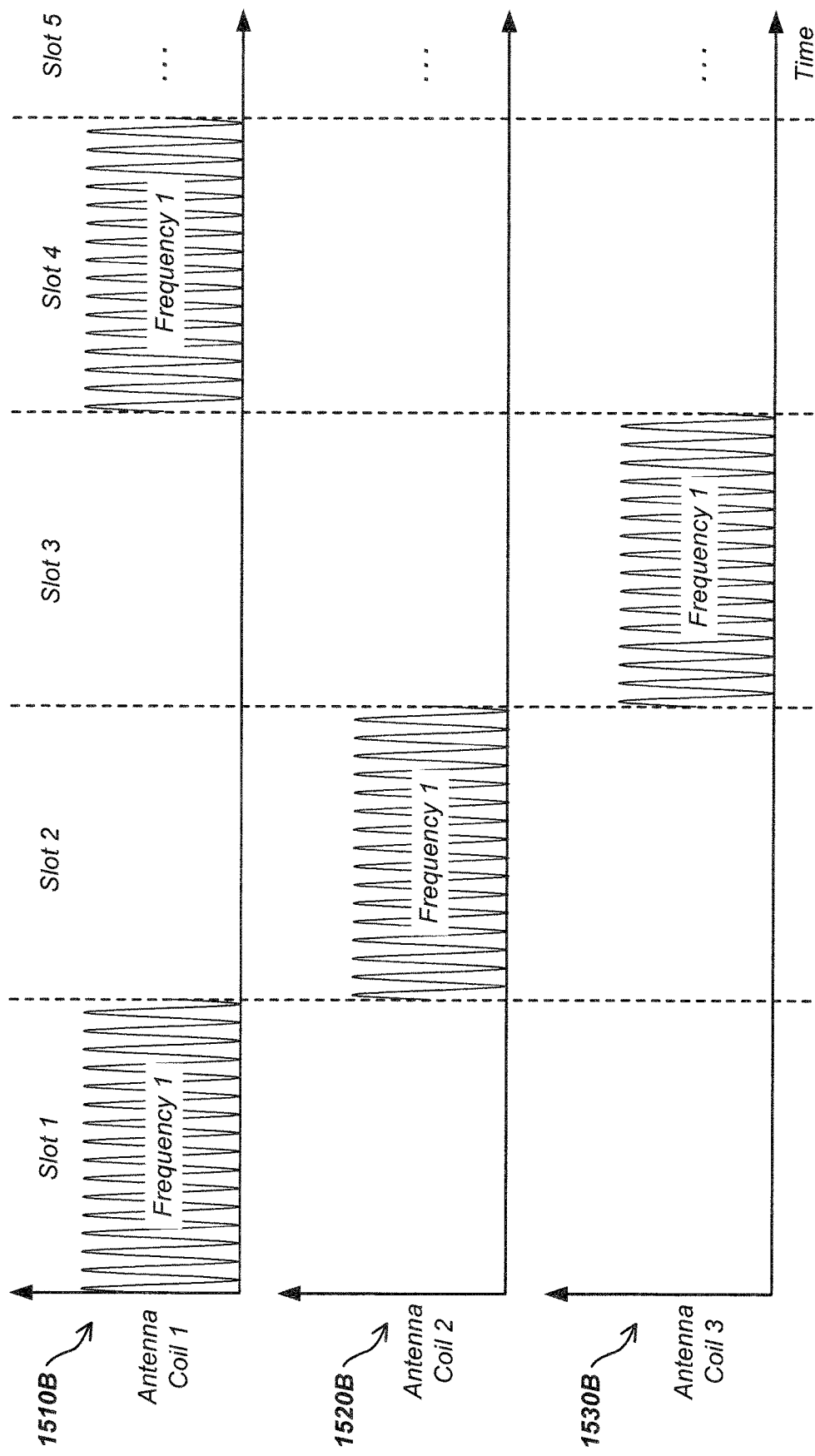
Figure 15C:
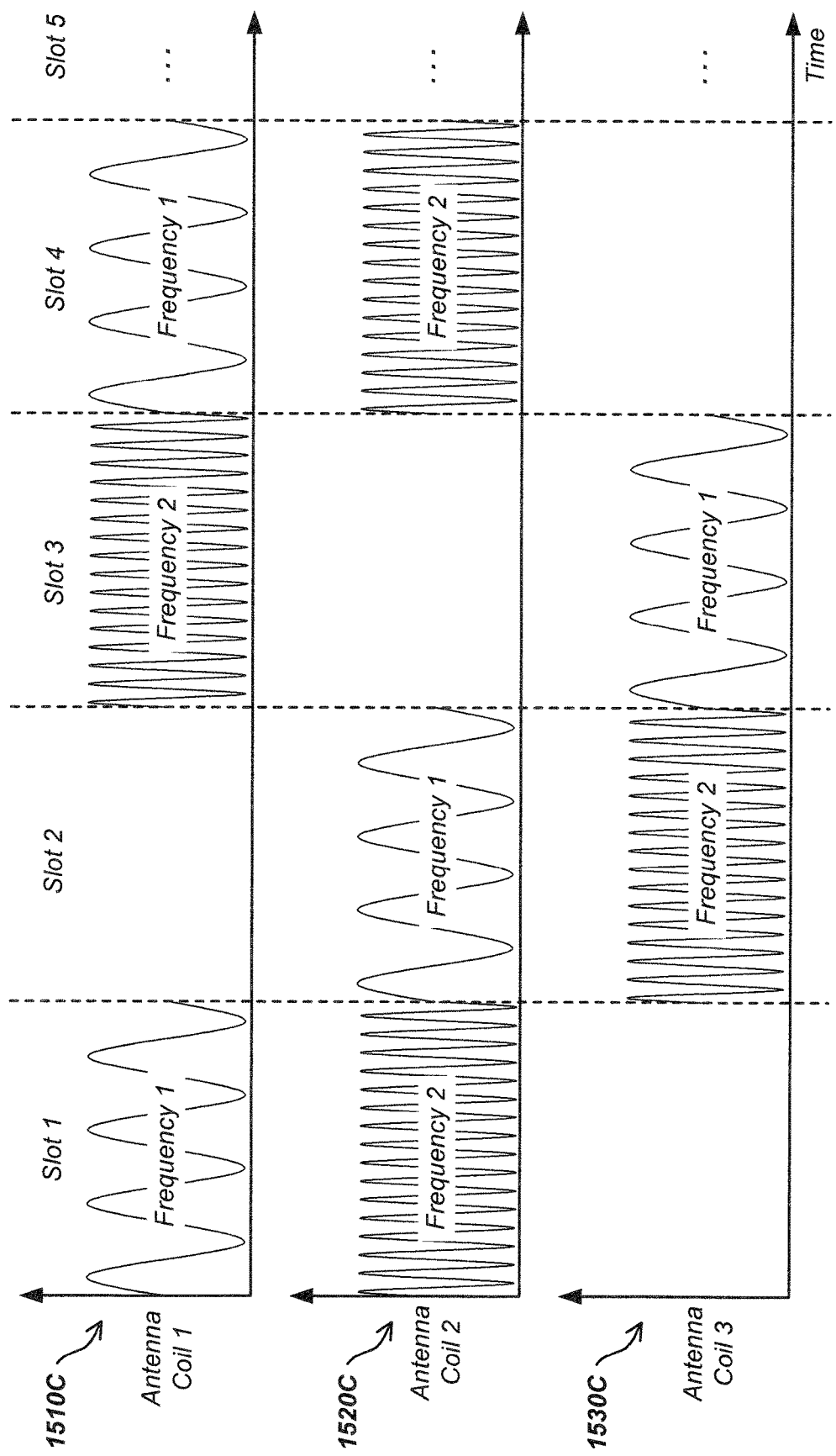
Figure 15D:
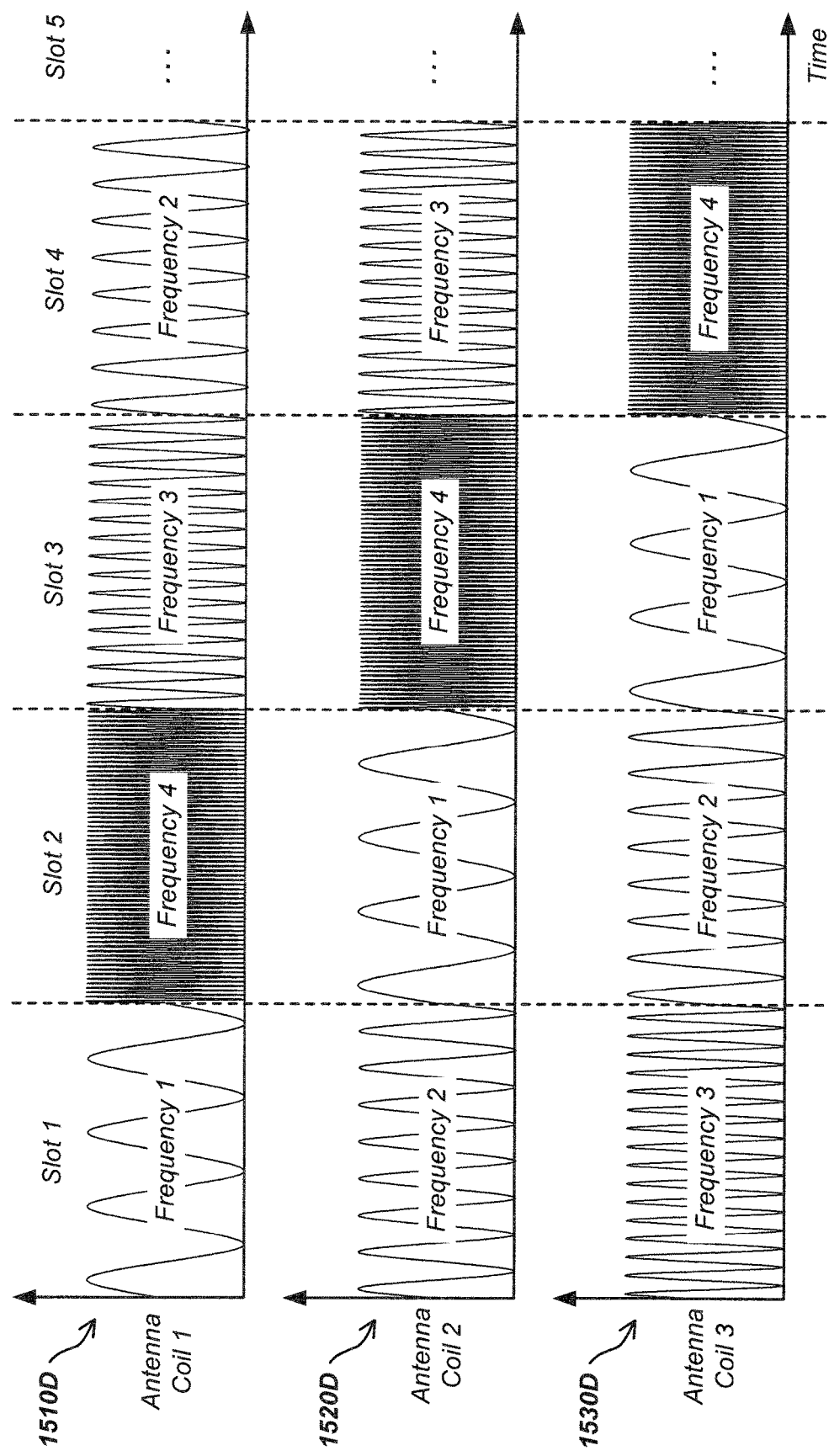

Other frequency, phase, and/or time-varied schema may be used in various embodiments. In some embodiments, the same frequency may be transmitted on all antenna coils at one time and therefore not require any switching scheme. In such embodiments, the omni-inducer device may have a dial allowing the user to manually select the desired frequency to transmit. It is further noted that more than or fewer than three frequencies may be used in some embodiments. For example, as shown in FIG. 15B, a single frequency may be used in some implementations. As shown in FIG. 15D, four (or more) frequencies may be used in other embodiments.

Figure 14A:
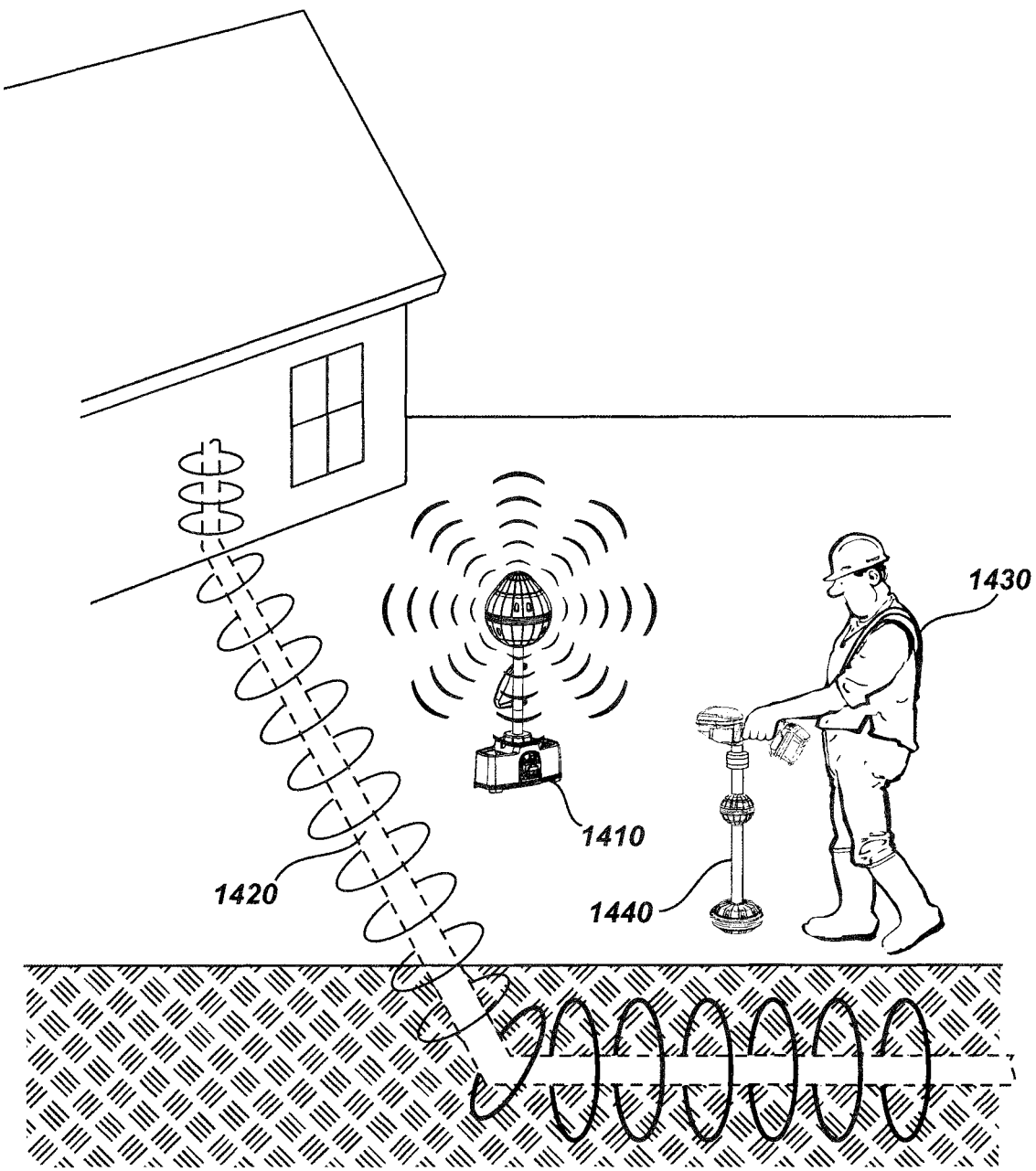
FIG. 14A illustrates details of an embodiment of an omni-inducer device, in use.

Turning to FIG. 14A, based on the orientation of the antenna coils and switching of frequencies, an omni-inducer device, such as the omni-inducer device 1410 as shown, may induce signals from each of one or more frequencies on buried pipes or other conductors, such as a pipe 1420, within range of the omni-inducer device. A corresponding locator device, such as locator device 1440, may then be used to receive and process corresponding signals radiated from the buried conductor (due to induced current flows in the conductor). If the locator has information regarding the timing of the transmitted signals, and/or the particular frequencies used and the associated sequence, and/or the location and/or orientation of the inducer 1410, the locator may operate more efficiently (e.g., by maintaining sync with induced/radiation signals, by maintaining phase, etc.) and/or may be able to determine additional information about the buried conductor.

As illustrated in FIG. 14A, a user 1430 may use an enabled locator device 1440 (e.g., one that is configured to maintain accurate time sync with the inducer and/or share other information, such as timing, position, etc., and use this to determine transmit signal sequence, phase, and/or other parameters) to locate and map the targeted pipe 1420. For example, an enabled locator such as the locator device 1440 may synchronize its time with an omni-inducer device, such as the omni-inducer device 1410, in order to ensure the locator device is only accounting for sensed signal when the transmitted frequency is at an interval of full amplitude as described in conjunction with FIG. 10, and/or to avoid ringing of digital filters on the locator device or other signal processing constraints.

Figure 14B:
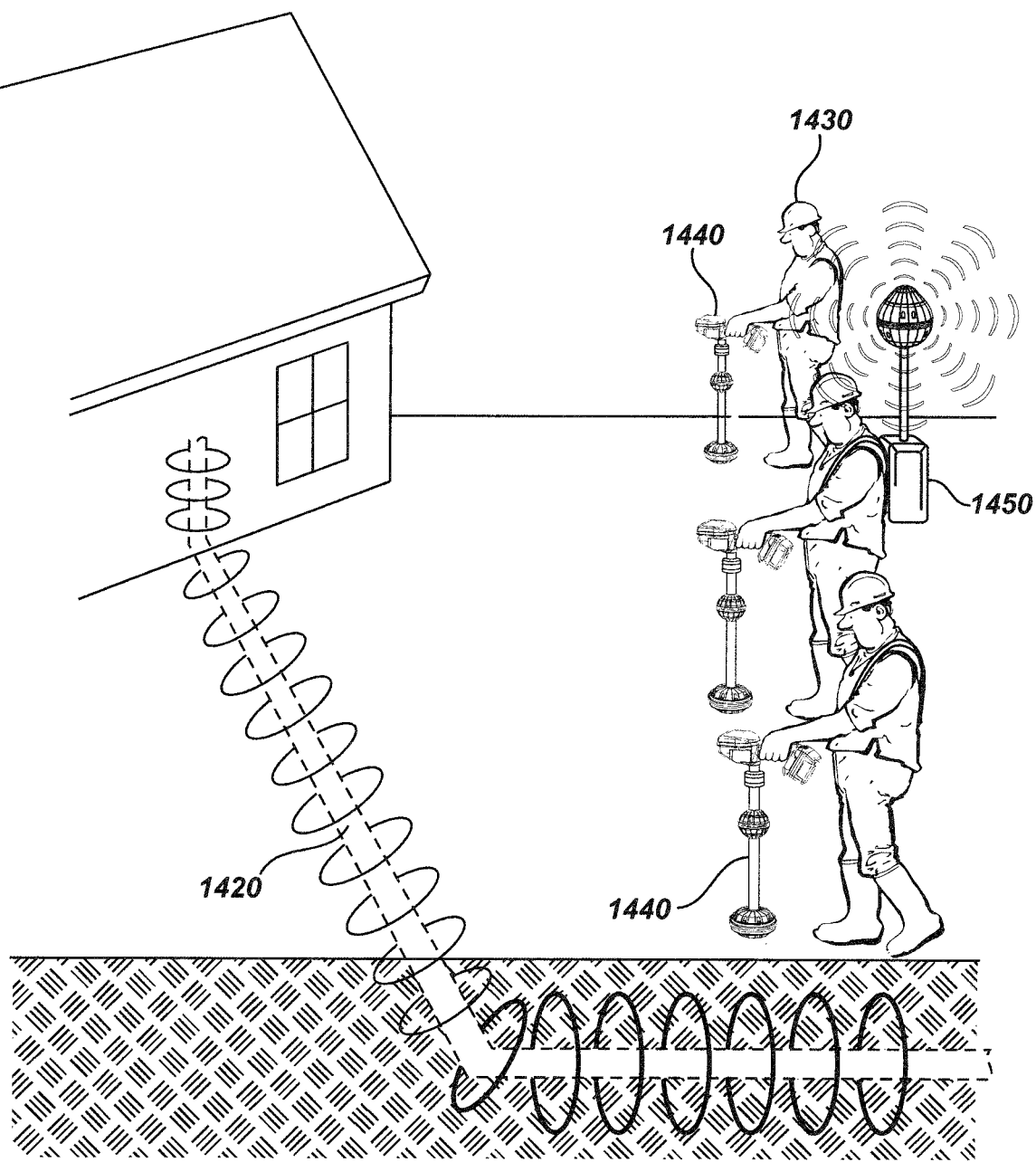
FIG. 14B illustrates details of an alternative embodiment of an omni-inducer device, in use.

Turning to FIG. 14B, a wearable omni-inducer embodiment may include the omni-inducer backpack 1450. In use, the omni-inducer backpack 1450 may be worn by one user 1430 while any number of other users 1430 carrying locator devices 1440 may walk beside the user 1430 with the omni-inducer backpack 1450. Such embodiments may be ideal for identifying crossing utilities for such applications as pipeline right of way surveys. In other uses, the carrier of the omni-inducer backpack 1450 may also carry and use a locator device 1440.

Figure 14C:
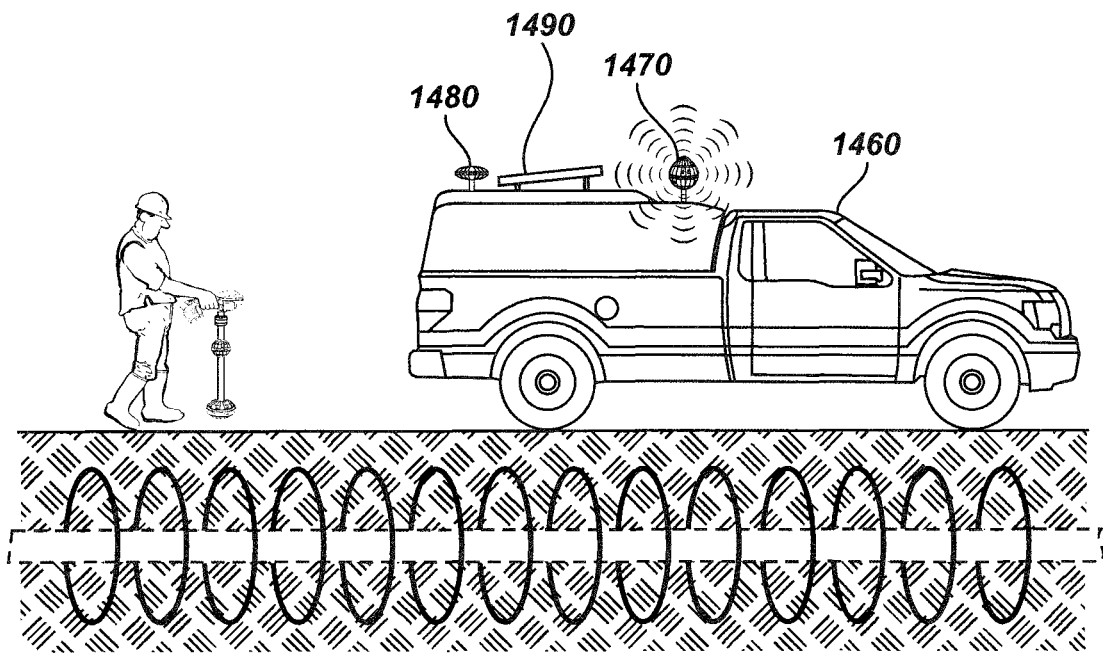
FIG. 14C illustrates details of another alternative embodiment of an omni-inducer device, in use.

Turning to FIG. 14C, an omni-inducer device in keeping with the present disclosure may be embedded into other devices or apparatus. For instance, an omni-inducer vehicle embodiment 1460 may include an omni-inducer device 1470. Other sensors and/or devices may be included in such an embodiment as embodiment 1460. A GPS antenna 1480 may, for instance, be included in embodiment 1460. Further teaching about GPS antenna technology may be found in U.S. Provisional Patent Application Ser. No. 61/618,746, entitled DUAL ANTENNA SYSTEMS WITH VARIABLE POLARIZATION, filed Mar. 31, 2012, and U.S. patent application Ser. No. 13/570,211, entitled PHASE-SYNCHRONIZED BURIED OBJECT LOCATOR APPARATUS, SYSTEM, AND METHODS, filed Aug. 8, 2012, the content of which is incorporated by reference herein in its entirety. In the embodiment 1460, a solar panel 1490 may be used to charge batteries (not illustrated) to power the omni-inducer device 1470 and other included sensors/apparatus.

Other embodiments of an omni-inducer device, in keeping with the present disclosure, may include a separate device or peripheral accessory that may be plugged into, for instance, a locating transmitter.

Examples of time synchronization methods include time synchronization using GPS receivers at both the locator and inducer, or other systems generating timing signals, ISM, cellular, or other radio communications to receive timing information and/or coordinate timing between locators and inducers, using known (at the locator) pre-defined switching patterns, and/or any other mechanism known or developed in the art for sharing such information. Further example ways of synchronizing time of a locator device and another associated device are described in co-assigned U.S. Provisional Patent Application No. 61/561,809 entitled MULTI-FREQUENCY LOCATING SYSTEMS AND METHODS filed Nov. 18, 2011, the content of which is incorporated by reference herein.

In some embodiments, a locator device may also be configured to recognize a pre-defined pattern of transmitted frequencies. In such embodiments, the locator device may recognize the pattern of frequencies transmitted and synchronize to the pattern accordingly Turning to FIGS. 15A to 15F, example transmitted signals are illustrated. It is noted that the signals shown in FIGS. 15A to 15F are provided for purposes of explanation, not limitation, and that various other signal sequences and timing may be used in various embodiments. FIG. 15A illustrates exemplary signal sequences where three coil assemblies, that are typically orthogonal or substantially orthogonal, are used to simultaneously send output signals, in the form of generated magnetic fields, at three frequencies. In FIG. 15A, as well as FIGS. 15B-15F, output signals are divided into slots of equal time duration, although the slots need not be equal in time in some embodiments. Antenna coil 1 sends signal 1510A (which may also represent current flow in a single antenna coil or in the secondary of a step-up antenna coil as described previously herein), antenna coil 2 sends signal 1520A, and antenna coil 3 sends signal 1530A. In particular, in slot 1, antenna coil 1 sends a signal at frequency 1, such as, for example, from a secondary coil in a node such as described previously herein, while antenna coil 2 sends a signal at frequency 2, and antenna coil 3 sends a signal at frequency 3. Signaling in successive slots may be as shown.

In an exemplary embodiment, frequency 1 may be 30 kHz or approximately 30 kHz, frequency 2 may be a multiple of frequency 1, so as to provide common zero-current points, and frequency 3 may be a multiple of frequencies 1 and 2. For example, frequency 2 may be four times frequency 1 (e.g., 120 kHz), and frequency 3 may be four times frequency 2 (e.g., 480 kHz).

Other base frequencies and multiples may be used in various embodiments. For example, allowable frequency constraints may the high and/or low end of allowable frequency spectrum due to interference with other electromagnetic usage. This may constrain the maximum and/or minimum frequencies (and, in some cases intermediate frequencies) usable. Therefore, for a given application, frequencies may be selected based on allowable frequencies of operation in the particular jurisdiction as well as based on characteristics of signals at the selected frequencies (e.g., differences in induction, coupling, propagation, etc.). It is noted that it may be desirable to maintain phase of signals at the different frequencies in successive slots. This may be advantageous for locator operation with respect to input filtering or other signal processing. For example, the phase of the transmitted signal at frequency 1 in slot 1 of antenna coil 1 may be maintained when frequency 1 is again sent from antenna coil 1 in slot 4. Similar phase synchronization may be used for the signals at frequencies 2 and 3 also.

FIG. 15B illustrates details of another embodiment of a signaling sequence using a single frequency. As noted previously herein, it is generally undesirable to send signals from multiple coils simultaneously at the same frequency. However, signals may be sent at different frequencies simultaneously (as shown in FIG. 15A) and/or signals may be turned off in all but one coil during a given slot. For example, signal 1510B illustrates a sequence of transmission of frequency 1 from antenna coil 1 in slot 1, with output then off for the next two slots and then repeated in slot 4. Corresponding signals 1520B and 1530B may be sent by antenna coils 2 and 3, respectively. FIG. 15C illustrates another embodiment similar to that shown in FIG. 15B, but using two frequencies, rather than one. In this case, signals 1510C, 1520C, and 1530C each send frequency 1 and frequency 2, with off slots in between as shown.

Figure 15E:
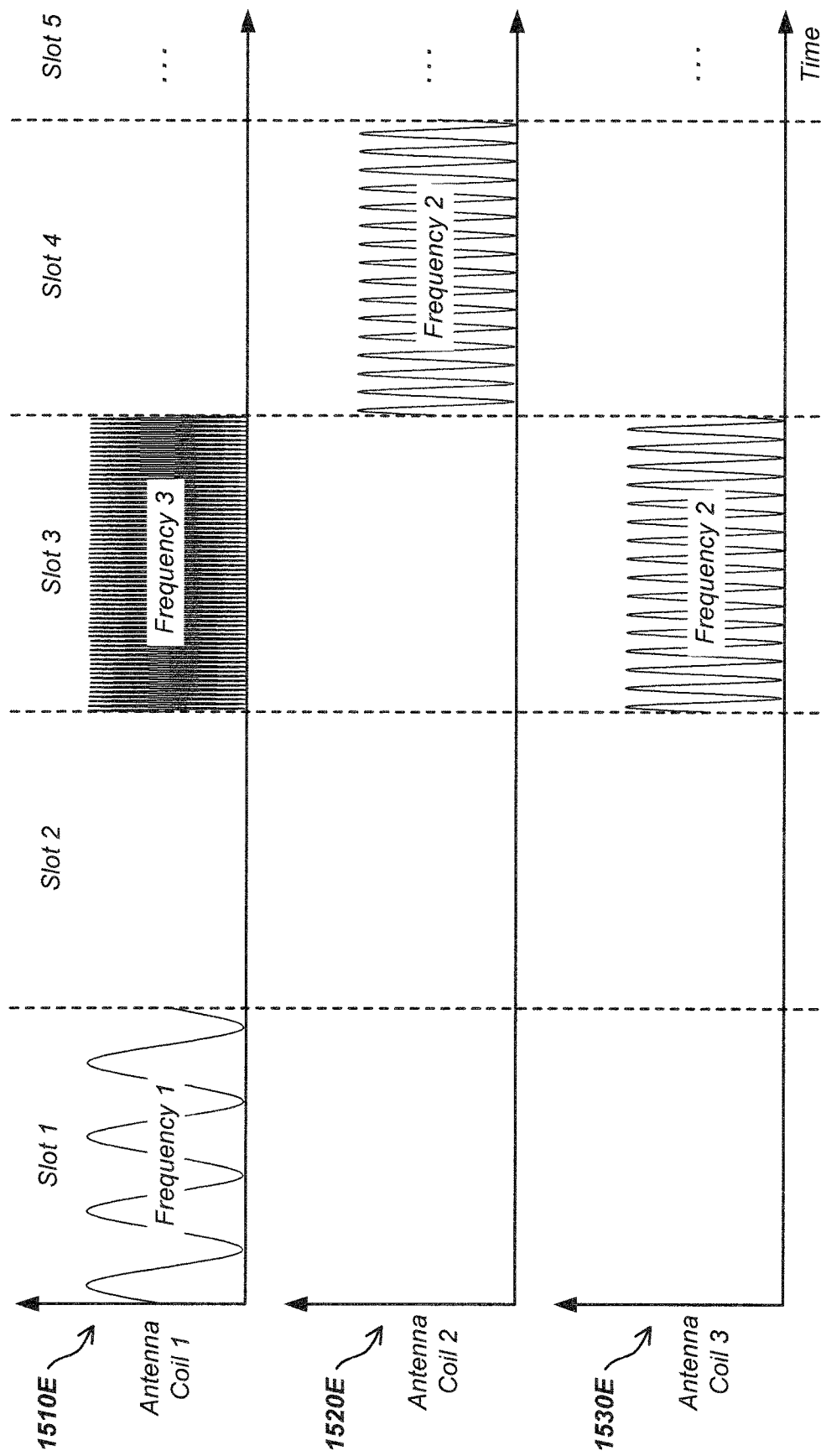

As noted previously, signaling need not be done at three or fewer frequencies, but rather can use more frequencies, to the extent that switching and tuning can be implemented. An example of this is shown in FIG. 15D, where four frequencies are used in sequences 1510D, 1520D, and 1530D. It is further noted that, while the signaling shown herein is illustrated as being periodic, it need not be so. For example, a predefined pseudo-random sequence may be used, in which case, the sequence is preferably known or communicated to the corresponding locator. An example of such a sequence is shown in FIG. 15E, where each of signals 1510E, 1520E, and 1530E may be selected, in time and/or frequency, based on some periodic or non-periodic sequence, such as a pseudo-random sequence. Other sequences, such as sequences using more slots of a particular frequency, dynamically determined frequencies, or other variations may also be used in some embodiments.

Figure 15F:
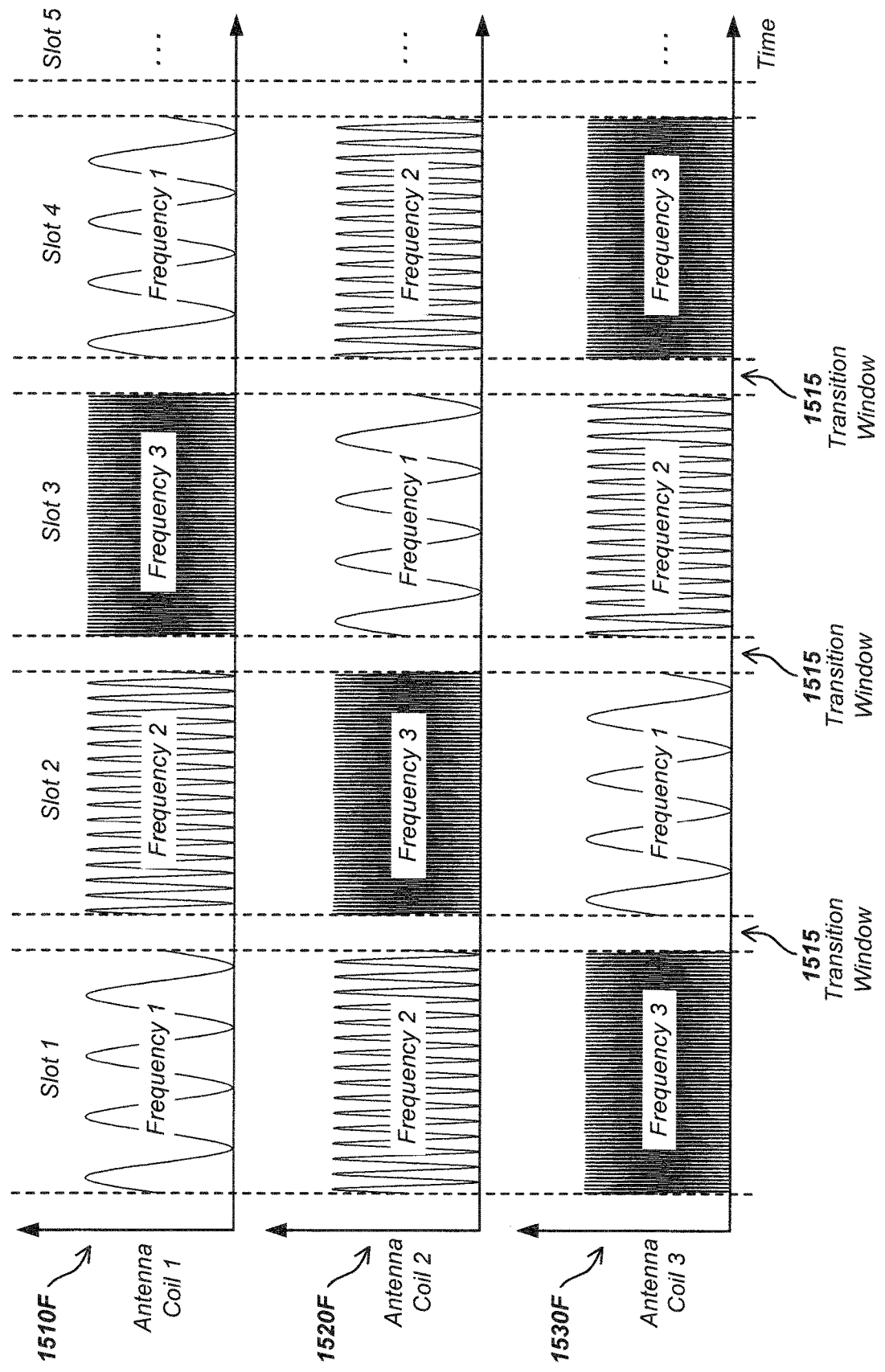

As noted previously herein and as illustrated in Table 900 of FIG. 9A and Table 902 of FIG. 9B, in some embodiments, a transition or off time period may be included between slots. For example, a transition window as shown in FIG. 15F may be used between slots, such as between slots in sequences 1510F, 1520F, and 1530F as shown.

In some embodiments, the antennas used to transmit signal may also be used to receive signal. In such an embodiment, the antennas may be used to sample the electromagnetic environment at the transmitter.

In some embodiments, embodiments as described herein may be configured as an attachable or plug in accessory to a locating transmitter.

In some embodiments, all three orthogonal antenna coils may be operated at the same frequency. By varying the phase and/or amplitude of the frequency between the antenna coils, a steerable single frequency dipole may be created. Such an embodiment may allow for steering of the dipole in space to scan the space around the omni-inducer device. In such embodiments, frequencies may be time domain multiplexed, such as the 30, 120, and 480 kHz or 7.5, 30, and 120 kHz frequencies mentioned in FIGS. 9A and 9B respectively, or other frequency sets in alternate embodiments.

In one example implementation, scanning may be done at 30 kHz, then scanning may be done at 120 kHz and then at 480 kHz sequentially in time at, for example, 1 second or longer or shorter intervals. If there are multiple buried lines in the ground and an inducing dipole axis is pointed directly at a (straight, linear) buried line, it is nulled and does not induce. The system may be configured to learn this characteristic. Once the system "learns" the relative position of nearby buried lines, it may alternately null one or the other or a plurality in sequence which can aid the locating received in separating multiple lines during the locating process.

In some embodiments, air coupling to an inductive transmitter may be mitigated by disregarding the in-phase (I) signal component of the signal. This may be done since there is typically a phase shift associated with coupling to the utility. If the phase of the transmitted signal (by GPS synchronization or other mechanisms), the signal received by the locator may be separated into in-phase (I) and quadrature (Q) components. The signal coupled to the utility would show up split between the I and Q components depending on the phase angle, but all of the air coupled signal would be in-phase. The Q component would contain a portion of the signal coupled to the utility (and noise). This could potentially allow locating right up to the transmitter.

As the locator is moved farther from the transmitter and the direct signal falls off as $1/R^3$, energy in the I component falls off more quickly than the Q component. At some point, a decision may be made that it is safe to switch to a net-power approach. If, for example, navigation information was included, ae $1/R^3$ decrease in signal as the locator is moved away may be determined and processing switched at a point where the contribution from the coupled utility is dominant.

Figure 16:
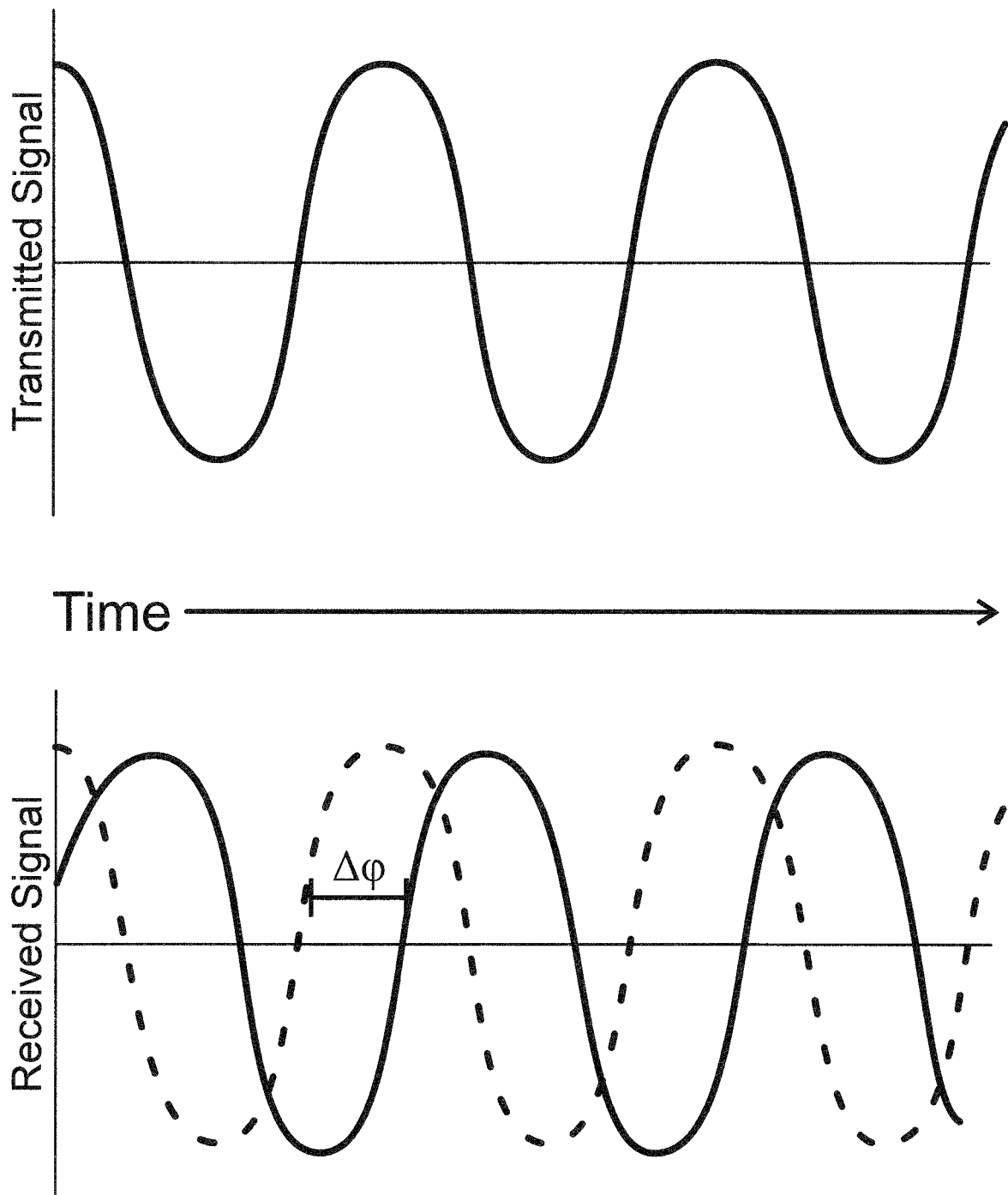
FIG. 16 illustrates details of an example signal which may have an absolute phase-shift correction applied in accordance with certain aspects.

Turning to FIG. 16, in some embodiments, a correction of absolute phase with respect to the locator receiver's received magnetic field is illustrated as $\Delta\varphi$. In such embodiments, the locating receiver may be synchronized or measured with respect to a precise time reference such as GPS. Such a correction may be based upon a modeled or empirically determined phase shift of the antennas and preamps as a function of received frequency. There may be a phase shift between the external magnetic field and the "induced" response of an antenna coil. In terms of absolute current direction and response, it may be desirable to correct for this. This may, for example, just be a single frequency empirically derived correction or other correction mechanism. In locators generating FFTs, it may be desirable to do a correction across a partial or entire frequency band such as, for example, from approximately 16 to 500 kHz or more.

In some embodiments, the exact phase shift of the magnetic output signal of an inducing or omni-inducing transmitter, such as the omni-inducer device of the present disclosure, may be communicated to an enabled locator device. In such embodiments, the locating receiver may be synchronized or measured with respect to a precise time reference such as GPS. The locating receiver may be configured to effectively discriminate the directly (air-locked) transmitted signal of an omni-inducer device from the phase shifted response of any currents induced in any buried utilities. In such embodiments, an enabled locating device may be enabled to more easily decouple the location of buried utilities close in proximity to an omni-inducer device in keeping with the present disclosure.

In some embodiments, the exact phase of the magnetic output signal of an inducing or omni-inducing transmitter may be communicated to the internal clock of a locating receiver so that the receiver can effectively discriminate the directly (air-locked) transmitted signal of the inducing transmitter from the phase shifted response of any currents induced in any buried utilities. This may be viewed as phase locking I (of I & Q signal components) to the induction transmitter output, and then looking at the magnitude of Q where any Q component measured should be associated with a phase shifted induced signal from a buried utility. If only the signal from the transmitter is being directly received (and corrected as, for example, described previously with respect to induced response), then Q component energy should be approximately equal to zero and substantially all the energy should be in the I component of the signal.

In one or more exemplary embodiments, the functions, methods and processes described may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media The various illustrative functions and circuits described in connection with the embodiments disclosed herein with respect to antenna coil and transmitter signal switching and/or other functions described herein may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The presently claimed invention is not intended to be limited to the aspects shown herein but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the present invention. Thus, the presently claimed invention is not intended to be limited to the aspects shown herein but is to be accorded the widest scope consistent with the appended claims and their equivalents.

We claim:

1. An omni-inducer device for inducing currents in a hidden or buried utility, comprising:
    a housing;
    a transmit antenna node including a plurality of transmit antenna coil assemblies, oriented so as to provide magnetic field signals in a plurality of orthogonal directions, disposed on, within, or operatively coupled to the housing; and
    a transmitter module disposed on, within, or operatively coupled to the housing for generating, simultaneously, individual ones of a plurality of output signals at a plurality of different frequencies for inductively coupling to the hidden or buried utility.

2. The device of claim 1, wherein ones of the plurality of transmit antenna coil assemblies each include a single antenna coil.

3. The device of claim 2, wherein each of the plurality of single antenna coils are arranged in a substantially orthogonal orientation relative to each other.

4. The device of claim 2, wherein the plurality of single antenna coils are arranged in a spherical shape.

5. The device of claim 3, wherein the plurality of single antenna coils are arranged in a spherical shape.

6. The device of claim 1, wherein one or more of the plurality of transmit antenna coil assemblies include two or more antenna coils.

7. The device of claim 1, wherein the plurality of transmit antenna coil assemblies comprise a primary antenna coil and a secondary antenna coil.

8. The device of claim 1, comprising a plurality of primary antenna coils, wherein ones of the plurality of primary antenna coils are arranged in a substantially orthogonal orientation relative to each other.

9. The device of claim 1, comprising a plurality of secondary antenna coils, wherein ones of the plurality of secondary antenna coils are arranged in a substantially orthogonal orientation relative to each other.

10. The device of claim 8 or 9, wherein the plurality of antenna coils are arranged in a spherical shape.

11. The device of claim 1, wherein one or more of the output signals are generated as frequency-switched between two or more different frequencies.

12. The device of claim 1, wherein one or more of the output signals are provided during one slot and switched off during a second, different slot.

13. The device of claim 1, further comprising a GPS antenna and GPS module.

14. The device of claim 1, further comprising an ISM radio antenna and transceiver.

15. The device of claim 1, further comprising a rechargeable battery to power the transmitter module.

16. The device of claim 15, further comprising a solar panel configured to recharge the rechargeable battery.

17. The device of claim 1, wherein the transmitter module is time-synchronized with a timing signal.

18. The device of claim 17, wherein the timing signal is provided to an associated buried utility locator so as to time synchronize the locator and omni-inducer.

19. The device of claim 17, wherein the timing signal is provided from a GPS receiver operatively coupled to the omni-inducer.

* * * * *